(12) United States Patent
Mao et al.

(10) Patent No.: US 12,483,733 B2
(45) Date of Patent: Nov. 25, 2025

(54) ENTROPY ENCODING/DECODING METHOD AND APPARATUS

(71) Applicant: HUAWEI TECHNOLOGIES CO., LTD., Guangdong (CN)

(72) Inventors: Jue Mao, Hangzhou (CN); Haitao Yang, Shenzhen (CN); Xiang Ma, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 18/191,990

(22) Filed: Mar. 29, 2023

(65) Prior Publication Data

US 2023/0239516 A1 Jul. 27, 2023

Related U.S. Application Data

(63) Continuation of application No. PCT/CN2021/120639, filed on Sep. 26, 2021.

(30) Foreign Application Priority Data

Sep. 30, 2020 (CN) .......................... 202011066451.7

(51) Int. Cl.
*H04N 19/91* (2014.01)
*H04N 19/132* (2014.01)
(Continued)

(52) U.S. Cl.
CPC ........... *H04N 19/91* (2014.11); *H04N 19/132* (2014.11); *H04N 19/172* (2014.11);
(Continued)

(58) Field of Classification Search
CPC .... G06N 3/044; G06N 3/0455; G06N 3/0464; G06N 3/047; G06N 3/0475; G06N 3/048;
(Continued)

(56) References Cited

U.S. PATENT DOCUMENTS 8,199,821 B2 * 6/2012 Jeon .................... H03M 7/4006
382/235
2020/0027247 A1 1/2020 Minnen et al.
(Continued)

FOREIGN PATENT DOCUMENTS

CN 110602494 A * 12/2019
EP 3562162 A1 10/2019

OTHER PUBLICATIONS

Changyue Ma et al, "Convolutional Neural Network-Based Arithmetic Coding for HEVC Intra-Predicted Residues", IEEE Transactions on Circuits and Systems for Video Technology, 2019, total 16 pages.
(Continued)

*Primary Examiner* — Shahan Ur Rahaman

(57) ABSTRACT

The technology of this application relates to an entropy encoding method that includes obtaining base layer information of a to-be-encoded picture block, where the base layer information corresponds to M samples in the picture block, and M is a positive integer, obtaining K elements corresponding to enhancement layer information of the picture block, where the enhancement layer information corresponds to N samples in the picture block, both K and N are positive integers, and N≥M, inputting the base layer information into a neural network to obtain K groups of probability values, where the K groups of probability values correspond to the K elements, and any group of probability values is for representing probabilities of a plurality of candidate values of a corresponding element, and performing entropy encoding on the K elements based on the K groups of probability values.

20 Claims, 14 Drawing Sheets

(51) Int. Cl.
*H04N 19/172* (2014.01)
*H04N 19/176* (2014.01)
*H04N 19/42* (2014.01)
*H04N 19/50* (2014.01)
*H04N 19/70* (2014.01)

(52) U.S. Cl.
CPC ........... *H04N 19/176* (2014.11); *H04N 19/42* (2014.11); *H04N 19/50* (2014.11); *H04N 19/70* (2014.11)

(58) Field of Classification Search
CPC ........ G06N 3/084; G06N 3/088; G06N 3/094; H04N 19/13; H04N 19/132; H04N 19/172; H04N 19/176; H04N 19/30; H04N 19/42; H04N 19/50; H04N 19/70; H04N 19/91
See application file for complete search history.

(56) References Cited

U.S. PATENT DOCUMENTS

| | | | | |
|---|---|---|---|---|
| 2020/0374522 | A1* | 11/2020 | Zhou | H04N 19/94 |
| 2021/0120247 | A1* | 4/2021 | Galpin | G06N 3/02 |
| 2022/0279183 | A1* | 9/2022 | Besenbruch | G06T 3/4046 |

OTHER PUBLICATIONS

Wei-Cheng Lee et al, "Learned Image Compression with Residual Coding", IEEE Conference on Computer Vision and Pattern Recognition Workshops, 2019, total 5 pages.
Rui Song et al, "Neural Network-Based Arithmetic Coding of Intra Prediction Modes in HEVC", arXiv:1709.05737v1 [cs. MM] Sep. 18, 2017, total 4 pages.
Heiko Schwarz et al, "Overview of the Scalable Video Coding Extension of the H.264/AVC Standard", IEEE Transactions on Circuits and Systems for Video Technology, vol. 17, No. 9, Sep. 2007, total 18 pages.
Hyomin Choi et al, "Scalable Video Coding Based on High Efficiency Video Coding (HEVC)", Proceedings of 2011 IEEE Pacific Rim Conference on Communications, Computers and Signal Processing, Nov. 2011, total 6 pages.
Johannes Ball et al, "Variational image compression with a scale hyperprior", arXiv: 1802.01436v2 [eess.IV] May 1, 2018, total 23 pages.
H.263 (Jan. 2005), Series H: Audiovisual and Multimedia Systems, Infrastructure of audiovisual services—Coding of moving video, Video coding for low bit rate communication, 226 pages.
H.264(Jun. 2019), Series H: Audiovisual and Multimedia Systems, Infrastructure of audiovisual services Coding of moving video, Advanced video coding for generic audiovisual services, 836 pages.
European Search Report for EP Application No. 21874376 dated Feb. 6, 2024, 9 pages.

* cited by examiner

ENTROPY ENCODING/DECODING METHOD AND APPARATUS

CROSS-REFERENCE TO RELATED APPLICATIONS

This application is a continuation of International Application No. PCT/CN2021/120639, filed on Sep. 26, 2021, which claims priority to Chinese Patent Application No. 202011066451.7, filed on Sep. 30, 2020. The disclosures of the aforementioned applications are hereby incorporated by reference in their entireties.

TECHNICAL FIELD

Embodiments of the present technology relate to the field of artificial intelligence (AI)-based video or picture compression technologies, and in particular, to an entropy encoding/decoding method and apparatus.

BACKGROUND

Video coding (e.g., video encoding and decoding) is used in a wide range of digital video applications, for example, broadcast digital TV, video transmission over Internet and mobile networks, real-time conversational applications such as video chat and video conferencing, DVD and Blu-ray discs, video content acquisition and editing systems, and camcorders of security applications.

An amount of video data needed to depict even a short video can be substantial, which may result in difficulties when the data is to be sent or otherwise communicated across a network with limited bandwidth capacity. Thus, video data is generally compressed before being communicated across modern telecommunication networks. Because memory resources may be limited, a problem about a size of a video may occur when the video is stored on a storage device. Video compression devices often use software and/or hardware at a source to code the video data prior to transmission or storage, thereby decreasing the amount of data needed to represent digital video pictures. The compressed data is then received at a destination by a video decompression device. With limited network resources and ever increasing demands of higher video quality, improved compression and decompression techniques that can improve a compression ratio with little to no sacrifice in picture quality are desirable. A layered coding technology provides concepts of time domain, space domain, and quality layering. Information about an enhancement layer is added based on a base layer to obtain video content being higher in frame rate, resolution, and quality. Different users can choose whether to require bit streams of the enhancement layer to match processing capabilities and network bandwidths of respective terminal devices of the users.

In recent years, deep learning is gaining popularity in the fields of picture and video encoding and decoding. In a deep learning-based layered coding technology, how to improve entropy coding efficiency becomes a technical problem to be resolved urgently.

SUMMARY

This application provides an entropy encoding/decoding method and apparatus, to improve entropy encoding/decoding efficiency.

According to a first aspect, this application provides an entropy encoding method, including: obtaining base layer information of a to-be-encoded picture block, where the base layer information corresponds to M samples in the picture block, and M is a positive integer; obtaining K elements corresponding to enhancement layer information of the picture block, where the enhancement layer information corresponds to N samples in the picture block, both K and N are positive integers, and N≥M; inputting the base layer information into a neural network to obtain K groups of probability values, where the K groups of probability values correspond to the K elements, and any group of probability values is for representing probabilities of a plurality of candidate values of a corresponding element; and performing entropy encoding on the K elements based on the K groups of probability values.

The picture block may be any complete picture frame in a video data stream, or may be any picture block or picture area obtained by partitioning any picture frame in the video data stream. For ease of description, in this application, a picture frame, a picture block, or a picture area is collectively referred to as a "picture block". It should be understood that, although referred to as a picture block, this is not a limitation on an encoded object.

In a layered coding technology, for a to-be-encoded picture block, an encoder may code the picture block in any encoding manner (for example, a hybrid encoding manner or an E2E picture encoding manner), and obtained encoded information is base layer information. The encoder decodes the encoded information in a decoding manner corresponding to the foregoing encoding manner to obtain a reconstruction value of the picture block, and then calculates a difference between an original value and the reconstruction value of the picture block, that is, enhancement layer information of the picture block.

It can be learned that, the base layer information of the picture block (assuming that the picture block includes N samples) corresponds to M samples in the picture block, where M≤N. This is because downsampling processing may be further included in a coding process, so that a quantity M of samples corresponding to the base layer information obtained through compression coding is less than a quantity N of samples included in the original picture block. If downsampling processing is not performed in the coding process, the quantity M of samples corresponding to the base layer information is equal to the quantity N of samples included in the original picture block.

In a possible implementation, the base layer information includes reconstruction values of the M samples.

The encoder may encode the picture block in an encoding manner such as E2E picture encoding to obtain encoded data, and then the encoder decodes the encoded data in a decoding manner corresponding to the encoding manner, to obtain the reconstruction values of the M samples in the picture block. Therefore, the base layer information may include the reconstruction values of the M samples.

In a possible implementation, the base layer information includes predicted values and/or residual values of the M samples.

The encoder encodes the picture block in a hybrid encoding manner to obtain encoded data, and then the encoder decodes the encoded data in a hybrid decoding manner to obtain predicted values and/or residual values of the M samples in the picture block. Based on encoding and decoding efficiency, a residual value obtained through decoding may be 0. When the residual value is 0, reconstruction values of the M samples may be obtained, that is, predicted values of the M samples. When the residual value is not 0, a sum calculation may be performed based on the predicted values of the M samples and the residual values to obtain the reconstruction values of the M samples. Therefore, the base layer information may include the reconstruction values of the M samples, or may include the predicted values and/or residual values of the M samples.

In a possible implementation, the base layer information refers to transform values of the M samples in the picture block.

After obtaining the residual values of the M samples, the encoder may transform (for example, DCT transform or DST transform) the residual values to obtain the transform values of the M samples. Optionally, the encoder may directly transform (for example, DCT transform or DST transform) original values of the M samples, to obtain the transform values of the M samples.

As a supplement to a gain of the picture block, the enhancement layer information corresponds to the N samples in the picture block. In this application, there may be the following several cases and obtaining methods for the K elements:

1. The K Elements are K Eigenvalues.

The encoder may perform feature extraction on original values of the N samples in the picture block, to obtain K eigenvalues. Based on this, the K elements are the K eigenvalues.

The enhancement layer information of the picture block may refer to the original values of the N samples. Therefore, the K elements corresponding to the enhancement layer information may be the K eigenvalues corresponding to the original values of the N samples.

Feature extraction is a concept in computer vision and picture processing, and refers to a method and a process of extracting characteristic information from a picture by using a computer. A result of feature extraction is to divide samples on the picture into different subsets, which usually belong to isolated points, continuous curves, or continuous regions. FIG. 8 is a schematic diagram of an example of a feature extraction method according to an embodiment of this application. As shown in FIG. 8, enhancement layer information (that is, original values of N samples) is represented by using an A×B×c matrix, where A×B represents a size of a picture block, and c represents a quantity of components in a color space of the picture block. For example, in a YUV color space, if c is 1, it indicates that three components Y, U, and V are encoded separately, that is, each of the three components corresponds to an A×B×1 matrix; if c is 2, it indicates that any two components of the three components Y, U, and V are encoded simultaneously, that is, any two components of the three components correspond to an A×B×2 matrix; and if c is 3, it indicates that the three components Y, U, and V are encoded simultaneously, that is, the three components correspond to an A×B×3 matrix. An encoder for feature extraction includes a convolution layer (cony) and a normalization layer (GND). For example, four convs and three GNDs are alternately cascaded to form an encoder. A size of the cony may be 5×5×192/2, where 5×5 represents a size of a convolution kernel, 192 represents a depth of a convolution layer (a quantity of included channels), and 2 represents a down-sampling factor. The encoder generates a P×Q×M matrix, where P×Q represents a size of a feature map, M represents a quantity of channels of the feature map, and values of elements in the matrix are the foregoing K eigenvalues.

2. The K Elements are K Difference Eigenvalues.

The encoder may perform hybrid encoding on the original values of the N samples to obtain encoded values of the N samples; perform hybrid decoding on the encoded values of the N samples to obtain reconstruction values of the N samples; perform a difference calculation based on the original values of the N samples and the reconstruction values of the N samples to obtain first differences of the N samples; and perform feature extraction on the first differences of the N samples to obtain K difference eigenvalues. Based on this, the K elements are the K difference eigenvalues.

The enhancement layer information of the picture block may refer to the first differences of the N samples. Therefore, the K elements corresponding to the enhancement layer information may be the K difference eigenvalues corresponding to the first differences of the N samples. Similarly, the encoder shown in FIG. 8 may be used to perform feature extraction on the enhancement layer information (that is, the first differences of the N samples) to obtain the K difference eigenvalues.

3. The K Elements are K Transform Value Eigenvalues.

The encoder may obtain predicted values of the N samples; perform a difference calculation based on original values of the N samples and the predicted values of the N samples to obtain second differences of the N samples; transform the second differences of the N samples to obtain transform values of the N samples; and perform feature extraction on the transform values of the N samples to obtain K transform value eigenvalues. Based on this, the K elements are the K transform value eigenvalues.

The enhancement layer information of the picture block may refer to the transform values of the N samples. Therefore, the K elements corresponding to the enhancement layer information may be the K transform value eigenvalues corresponding to the transform values of the N samples. Similarly, the encoder shown in FIG. 8 may be used to perform feature extraction on the enhancement layer information (that is, the transform values of the N samples) to obtain the K transform value eigenvalues.

4. The K Elements Include Coordinates of a Last Non-Zero Value, a First Value, and Other Values.

The encoder may obtain predicted values of the N samples; perform a difference calculation based on original values of the N samples and the predicted values of the N samples to obtain second differences of the N samples; transform the second differences of the N samples to obtain transform values of the N samples; quantize the transform values of the N samples to obtain quantized transform values of the N samples; and extract coordinates of a last non-zero value from the quantized transform values of the N samples, a first value of the quantized transform values of the N samples, and all values between a second value of the quantized transform values of the N samples and the last non-zero value. Based on this, the K elements include the coordinates of the last non-zero value, the first value, and the all values between the second value and the last non-zero value.

The enhancement layer information of the picture block may refer to the quantized transform values of the N samples. Therefore, the K elements corresponding to the enhancement layer information may include the coordinates of the last non-zero value (Last x,y) extracted from the quantized transform values of the N samples, the first value (DC coefficient) of the quantized transform values of the N samples, and the all values (AC coefficient) between the second value of the quantized transform values of the N samples and the last non-zero value. It should be noted that some of the quantized transform values of the N samples may be the same. For example, if the first value, the second value, and the third value are all equal, the DC coefficient is the first value in the quantized transform values of the N samples, and the AC coefficient is obtained from the second value in the quantized transform values of the N samples to the last non-zero value. The second value and the third value are two same numbers, and are also the same as the DC coefficient. The last non-zero value is obtained because all values after the last non-zero value are 0. Therefore, probability values of these 0 s do not need to be obtained. However, one or more of all values between the second value in the quantized transform values of the N samples and the last non-zero value may also be 0, and a probability value of such a 0 needs to be obtained.

Optionally, the encoder may perform hybrid encoding on the original values of the M samples corresponding to the base layer information to obtain encoded values of the M samples; perform hybrid decoding on the encoded values of the M samples to obtain the reconstruction values of the M samples; and obtain the predicted values of the N samples based on the reconstruction values of the M samples. In a possible implementation, when hybrid encoding is performed on the original values of the M samples, only mode information related to prediction modes of the M samples is encoded, and an encoded object does not include residual values of the M samples. In this case, the reconstruction values of the M samples obtained by performing hybrid decoding on the encoded values of the M samples are the predicted values of the M samples.

When N=M, the encoder may obtain the predicted values of the N samples based on the reconstruction values of the M samples; or when N>M, the encoder needs to first perform interpolation on the reconstruction values of the M samples to obtain reconstruction values of the N samples, and then obtain the predicted values of the N samples based on the reconstruction values of the N samples.

The neural network is obtained by performing training by a training engine based on a training dataset. The neural network may process base layer information of an input picture block, to generate K groups of probability values corresponding to the K elements. FIG. 9 is a structural diagram of an example of a neural network according to an embodiment of this application. As shown in FIG. 9, the neural network includes a convolution layer (cony) and an activation layer (ReLU). For example, four convs and three ReLUs are alternately cascaded to form the neural network. A size of a first cony may be 1×3×3×M/2, 1 represents a quantity of channels of an input picture block, 3×3 represents a size of a convolution kernel, M represents a quantity of channels of a feature map outputted by a convolution layer, and 2 represents a downsampling factor. A size of a second cony may be M×3×3×M/2, M represents a quantity of channels of an input picture block, 3×3 represents a size of a convolution kernel, M represents a quantity of channels of a feature map outputted by a convolution layer, and 2 represents a downsampling factor. A size of a third cony may be M×3×3×M/2, M represents a quantity of channels of an input picture block, 3×3 represents a size of a convolution kernel, M represents a quantity of channels of a feature map outputted by a convolution layer, and 2 represents a downsampling factor. A size of a fourth cony may be M×3×3× 2M/2, M represents a quantity of channels of an input picture block, 3×3 represents a size of a convolution kernel, 2M represents a quantity of channels of a feature map outputted by a convolution layer, and 2 represents a downsampling factor.

In this embodiment of this application, the training dataset is associated with the foregoing K elements. To be specific, for different physical meanings of the K elements, the training dataset changes accordingly.

Optionally, when the K elements are the K eigenvalues, the K difference eigenvalues, or the K transform value eigenvalues, the training dataset includes original values of M samples of each of a plurality of picture blocks and K groups of probability values respectively corresponding to N samples of each of the plurality of picture blocks.

Optionally, when the K elements are the Last x,y, the DC coefficient, and the AC coefficient, the training dataset includes quantized transform values of M samples of each of a plurality of picture blocks and K groups of probability values respectively corresponding to N samples of each of the plurality of picture blocks.

In a possible implementation, a process in which the training engine trains the neural network includes: training the neural network on NVIDIA V100 GPUs by using PyTorch software. For example, an adaptive moment estimation (Adam) algorithm is used to optimize and train the neural network, and a DIV2K dataset is used as a training dataset of the neural network. At a base layer of a picture block, compression coding is performed on the picture block by using VVC reference software, and a residual value (that is, enhancement layer information) of the enhancement-layer picture block is obtained through calculation by using an original value of the picture block and a reconstruction value (obtained by using base layer information of the picture block) of the picture block. An encoder network extracts an eigenvalue of the residual value of the enhancement-layer picture block, the neural network estimates probability distribution of the eigenvalue of the residual value of the enhancement-layer picture block based on the residual value corresponding to the base layer information, and a decoder network reconstructs the residual value of the enhancement-layer picture block based on the eigenvalue of the residual value. To efficiently couple the encoder network, the decoder network, and the entropy estimation neural network, the encoder network, the decoder network, and the entropy estimation neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}[-\log_2 p_y(y)] + \lambda \mathbb{E} \|\Delta x - \Delta x'\|_2$$

$p_y(y)$ represents a $y^{th}$ group of probability values outputted by the neural network, $\Delta x$ represents the residual value of the picture block, and $\Delta x'$ represents the reconstruction value of the residual value of the picture block.

In a possible implementation, a process in which the training engine trains the neural network includes: training the neural network on NVIDIA V100 GPUs by using PyTorch software. For example, an Adam algorithm is used to optimize and train the neural network, and a DIV2K dataset is used as a training dataset of the neural network. At a base layer of a picture block, compression coding is performed on the picture block by using VVC reference software, then decoding is performed to obtain a reconstruction value of the picture block, and a residual value of the enhancement-layer picture block is obtained through calculation by using an original value of the picture block and the reconstruction value (obtained by using base layer information of the picture block) of the picture block. An encoder network extracts an eigenvalue of the residual value of the enhancement-layer picture block, the neural network estimates probability distribution of the eigenvalue of the residual value of the enhancement-layer picture block based on a base-layer reconstruction value. The decoder reconstructs a higher-quality reconstruction value based on the eigenvalue of the residual value and the base-layer reconstruction value. To efficiently couple the encoder, the decoder, and the neural network, the encoder, the decoder, and the neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}_{[-\log_2 p_y(y)]} + \lambda \mathbb{E}_{\|x-x'\|_2}$$

x represents the original value of the picture block, and x' represents the reconstruction value of the picture block.

In a possible implementation, a process in which the training engine trains the neural network includes: training the neural network on NVIDIA V100 GPUs by using PyTorch software. For example, an Adam algorithm is used to optimize the neural network, and a DIV2K dataset is used as a training dataset of the neural network. At a base layer of a picture block, compression coding is performed by using any codec, and then decoding is performed to obtain a reconstruction value (obtained by using base layer information of the picture block) of the picture block. At an enhancement layer of the picture block, compression coding is performed on the picture block by using VVC reference software, and a transform value of the picture block is extracted. An encoder network extracts an eigenvalue of the transform value of the enhancement-layer picture block, the neural network estimates probability distribution of the eigenvalue of the transform value of the enhancement-layer picture block based on a transform value of a base-layer reconstruction value. The decoder reconstructs the transform value of the enhancement-layer picture block based on the eigenvalue of the transform value. To efficiently couple the encoder, the decoder, and the neural network, the encoder, the decoder, and the neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}_{[-\log_2 p_y(y)]} + \lambda \mathbb{E}_{\|T-T'\|_2}$$

$p_y(y)$ represents a $y^{th}$ group of probability values outputted by the neural network, T represents the transform value of the picture block, and T' represents the transform value of the residual value of the picture block.

The K groups of probability values correspond to the foregoing K elements, and any group of probability values is for representing probabilities of a plurality of candidate values of a corresponding element. For example, FIG. 10 is a schematic diagram of an example of K elements according to an embodiment of this application. As shown in FIG. 10, it is assumed that the K elements include four feature points A, B, C, and D, and value ranges of the four feature points are all {−2, −1, 0, 1, 2}. A group of probability values corresponding to A includes four probability values, and the four probability values respectively correspond to four values in the value range {−2, −1, 0, 1, 2} of A. A group of probability values corresponding to B includes four probability values, and the four probability values respectively correspond to four values in the value range {−2, −1, 0, 1, 2} of B. The rest can be deduced by analogy. It can be learned that each feature point (element) corresponds to a group of probability values, and a quantity of probability values included in each group of probability values is associated with a value range of a feature point corresponding to the group of probability values.

The base layer information obtained in this application is inputted into the neural network to obtain K groups of probability values. The neural network may include a convolution layer (cony) and an activation layer (ReLU). For example, four convs and three ReLUs are alternately cascaded to form the neural network. For training and use of the neural network, refer to related descriptions of the training engine.

In a possible implementation, when the probabilities of the plurality of candidate values of the some or all of the K elements in the foregoing several cases satisfy the Gaussian distribution, a group of probability values corresponding to an element that satisfies the Gaussian distribution includes a variance and a mean of the Gaussian distribution satisfied by the element. In other words, values of each element are discrete. Therefore, probabilities of a plurality of candidate values of one or more elements satisfy Gaussian probability distribution. Therefore, the neural network may use a variance and a mean of Gaussian distribution satisfied by each of the one or more elements to represent probability values of the plurality of candidate values of each of the one or more elements.

In this application, entropy coding is performed by using K groups of probability values outputted by the neural network. For example, as shown in FIG. 10, value ranges of A, B, C, and D are all {−2, −1, 0, 1, 2}. For each candidate value of A, a probability value of −2 is 0.1, a probability value of −1 is 0.2, a probability value of 0 is 0.4, a probability value of 1 is 0.2, and a probability value of 2 is 0.1. For each candidate value of B, a probability value of −2 is 0.15, a probability value of −1 is 0.3, a probability value of 0 is 0.3, a probability value of 1 is 0.2, and a probability value of 2 is 0.05. For each candidate value of C, a probability value of −2 is 0.05, a probability value of −1 is 0.1, a probability value of 0 is 0.4, a probability value of 1 is 0.4, and a probability value of 2 is 0.05. For each candidate value of D, a probability value of −2 is 0.5, a probability value of −1 is 0.2, a probability value of 0 is 0.15, a probability value of 1 is 0.1, and a probability value of 2 is 0.05. Therefore, FIG. 11 is a schematic diagram of an example of an arithmetic coding algorithm according to an embodiment of this application. As shown in FIG. 11, based on the arithmetic coding algorithm, a probability interval [0, 1] is divided layer by layer based on respective values of A, B, C, and D, and the respective values of A, B, C, and D are represented as an interval within a probability interval corresponding to A, B, C, and D. A lower boundary of a finally outputted "current interval" is an encoded code word. It is assumed that values of A, B, C, and D are all 0. Based on probability values of candidate values of A, a probability interval [0, 1] is divided into five intervals: 0 to 0.1, 0.1 to 0.3, 0.3 to 0.7, 0.7 to 0.9, and 0.9 to 1, where an interval corresponding to the value 0 is 0.3 to 0.7. Based on probability values of candidate values of B, a probability interval [0.3, 0.7] is divided into five intervals: 0.3 to 0.36, 0.36 to 0.48, 0.48 to 0.6, 0.6 to 0.68, and 0.68 to 0.7, where an interval corresponding to the value 0 is 0.48 to 0.6. Based on probability values of candidate values of C, a probability interval [0.48, 0.6] is divided into five intervals: 0.48 to 0.486, 0.486 to 0.498, 0.498 to 0.546, 0.546 to 0.594, and 0.594 to 0.6, where an interval corresponding to the value 0 is 0.498 to 0.546. Based on probability values of candidate values of D, a probability interval [0.498, 0.546] is divided into five intervals: 0.498 to 0.522, 0.522 to 0.5316, 0.5316 to 0.5388, 0.5388 to 0.5436, and 0.5436 to 0.546, where an interval corresponding to the value 0 is 0.5316 to 0.5388. Therefore, the "current interval" is 0.5316 to 0.5388, and has a lower boundary 0.5316 used as an encoded code word. The encoder may write 0.5316 fixed-point representation into a bit stream.

In this application, a correlation between the enhancement layer and the base layer in the layered coding technology is fully explored, probability estimation is performed on a plurality of elements corresponding to the enhancement layer information by using the base layer information, to obtain probability values of high accuracy, and then entropy coding is performed on the plurality of elements based on the probability values, thereby improving entropy coding efficiency.

According to a second aspect, this application provides an entropy decoding method, including: obtaining a bit stream; parsing the bit stream to obtain base layer information and encoded data of a to-be-decoded picture block, where the base layer information corresponds to M samples in the picture block, the encoded data corresponds to enhancement layer information, the enhancement layer information corresponds to N samples in the picture block, both M and N are positive integers, and N≥M; inputting the base layer information into a neural network to obtain K groups of probability values, where the K groups of probability values correspond to K elements, any group of probability values is for representing probabilities of a plurality of candidate values of a corresponding element, and K is a positive integer; performing entropy decoding on the encoded data based on the K groups of probability values to obtain the K elements; and obtaining reconstruction values of the N samples based on the K elements, where N is a positive integer.

A decoder may receive the bit stream by using a communication link between the decoder and an encoder. For the to-be-decoded picture block, the decoder parses the bit stream corresponding to the to-be-decoded picture block, and obtains the base layer information from data, where the base layer information corresponds to the M samples in the picture block. The bit stream further includes the encoded data corresponding to the enhancement layer information of the picture block, and the decoder may read the encoded data from a data payload, where the enhancement layer information corresponds to the N samples in the picture block, and N≥M.

The K groups of probability values correspond to the K elements, and any group of probability values is for representing probabilities of a plurality of candidate values of a corresponding element. For example, as shown in FIG. 10 and FIG. 11, obtained encoded code words are 0.5316 and probability values of five candidate values of each of four feature points A, B, C, and D. For each candidate value of A, an interval to which 0.5316 belongs is 0.3 to 0.7, and the interval corresponds to a value 0, so that a value of A is 0. For each candidate value of B, an interval to which 0.5316 belongs is 0.48 to 0.6, and the interval corresponds to a value 0, so that a value of B is 0. For each candidate value of C, an interval to which 0.5316 belongs is 0.498 to 0.546, and the interval corresponds to a value 0, so that a value of C is 0. For each candidate value of D, an interval to which 0.5316 belongs is 0.5316 to 0.5388, and the interval corresponds to a value 0, so that a value of D is 0. Therefore, it can be learned that the K elements are the four feature points A, B, C, and D, and values of the four feature points are all 0.

Corresponding to the encoder side, the K elements may also be implemented in a plurality of manners, and specific representation objects of the K elements may be agreed upon by both the encoder side and the decoder side; or the encoder side may add indication information of the K elements to a bit stream and transmit the bit stream to the decoder side, and the decoder side parses the bit stream to obtain the indication information.

1. The K elements are K eigenvalues.

The decoder may perform inverse feature extraction on the K eigenvalues to obtain the reconstruction values of the N samples.

2. The K elements are K difference eigenvalues.

The decoder may perform inverse feature extraction on the K difference eigenvalues to obtain first differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the first differences of the N samples.

3. The K elements are K transform value eigenvalues.

The decoder may perform inverse feature extraction on the K transform value eigenvalues to obtain transform values of the N samples; inversely transform the transform values of the N samples to obtain second differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the second differences of the N samples.

4. The K elements include coordinates of a last non-zero value of transform values of the N samples, a first value of the transform values of the N samples, and all values between a second value of the quantized transform values of the N samples and the last non-zero value The decoder may perform inverse quantization based on the coordinates of the last non-zero value, the first value, and the all values between the second value and the last non-zero value to obtain transform values of the N samples; inversely transform the transform values of the N samples to obtain second differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the second differences of the N samples.

Optionally, when N>M, the decoder may perform interpolation on the reconstruction values of the M samples to obtain reconstruction values of the N samples; and perform a sum calculation based on the reconstruction values of the N samples and the first differences of the N samples to obtain reconstruction values of the N samples. Alternatively, when N=M, the decoder may perform a sum calculation based on the reconstruction values of the M samples and the first differences of the N samples to obtain reconstruction values of the N samples.

Optionally, when N>M, the decoder may perform interpolation on the predicted values of the M samples to obtain predicted values of the N samples; and perform a sum calculation based on the predicted values of the N samples and the second differences of the N samples to obtain the reconstruction values of the N samples; or when N=M, the decoder may perform a sum calculation based on the predicted values of the M samples and the second differences of the N samples to obtain reconstruction values of the N samples.

In the bit stream of this application, an enhancement layer carries only a plurality of element values corresponding to the enhancement layer information of the picture block, and the decoder side uses the neural network to estimate, based on the base layer information, probability values of a plurality of candidate values of a plurality of elements corresponding to the enhancement layer information. Therefore, no additional hidden variable needs to be encoded and transmitted, thereby saving bytes and improving entropy decoding efficiency.

According to a third aspect, this application provides an entropy encoding apparatus, including: an obtaining module, configured to obtain base layer information of a to-be-encoded picture block, where the base layer information corresponds to M samples in the picture block, and M is a positive integer; obtain K elements corresponding to enhancement layer information of the picture block, where the enhancement layer information corresponds to N samples in the picture block, both K and N are positive integers, and N≥M; and input the base layer information into a neural network to obtain K groups of probability values, where the K groups of probability values correspond to the K elements, and any group of probability values is for representing probabilities of a plurality of candidate values of a corresponding element; and an entropy encoding module, configured to perform entropy encoding on the K elements based on the K groups of probability values.

In a possible implementation, the base layer information includes reconstruction values of the M samples; the base layer information includes predicted values and/or residual values of the M samples; or the base layer information includes transform values of the M samples.

In a possible implementation, the obtaining module is specifically configured to perform feature extraction on original values of the N samples to obtain K eigenvalues, where correspondingly, the K elements are the K eigenvalues.

In a possible implementation, the obtaining module is specifically configured to: perform hybrid encoding on original values of the N samples to obtain encoded values of the N samples; perform hybrid decoding on the encoded values of the N samples to obtain reconstruction values of the N samples; perform a difference calculation based on the original values of the N samples and the reconstruction values of the N samples to obtain first differences of the N samples; and perform feature extraction on the first differences of the N samples to obtain K difference eigenvalues, where correspondingly, the K elements are the K difference eigenvalues.

In a possible implementation, the obtaining module is specifically configured to: obtain predicted values of the N samples; perform a difference calculation based on original values of the N samples and the predicted values of the N samples to obtain second differences of the N samples; transform the second differences of the N samples to obtain transform values of the N samples; and perform feature extraction on the transform values of the N samples to obtain K transform value eigenvalues, where correspondingly, the K elements are the K transform value eigenvalues.

In a possible implementation, the obtaining module is specifically configured to: obtain predicted values of the N samples; perform a difference calculation based on original values of the N samples and the predicted values of the N samples to obtain second differences of the N samples; transform the second differences of the N samples to obtain transform values of the N samples; quantize the transform values of the N samples to obtain quantized transform values of the N samples; and extract coordinates of a last non-zero value from the quantized transform values of the N samples, a first value, and all values between a second value of the quantized transform values of the N samples and the last non-zero value, where correspondingly, the K elements include the coordinates of the last non-zero value, the first value, and the all values.

In a possible implementation, the obtaining module is specifically configured to: perform hybrid encoding on original values of the M samples to obtain encoded values of the M samples; perform hybrid decoding on the encoded values of the M samples to obtain the reconstruction values of the M samples; and obtain the predicted values of the N samples based on the reconstruction values of the M samples.

In a possible implementation, the obtaining module is specifically configured to: when N=M, obtain the predicted values of the N samples based on the reconstruction values of the M samples; or when N>M, perform interpolation on the reconstruction values of the M samples to obtain reconstruction values of the N samples, and obtaining the predicted values of the N samples based on the reconstruction values of the N samples.

In a possible implementation, when probabilities of a plurality of candidate values of a first element satisfy Gaussian distribution, a group of probability values corresponding to the first element includes a variance and a mean of the Gaussian distribution satisfied by the probabilities of the plurality of candidate values of the first element, and the first element is any one of the K elements.

In a possible implementation, the neural network includes a convolution layer; a depth of a convolution kernel of the convolution layer is 24, 32, 48, 64, 192, or 384; and a size of the convolution kernel of the convolution layer is 1×1, 3×3, 5×5, or 7×7.

In a possible implementation, the neural network includes a convolutional neural network (CNN), a deep neural network (DNN), or a recurrent neural network (RNN).

In a possible implementation, the apparatus further includes: a training module, configured to obtain a training dataset, where the training dataset includes original values of M samples of each of a plurality of picture blocks and K groups of probability values respectively corresponding to N samples of each of the plurality of picture blocks; or the training dataset includes quantized transform values of M samples of each of a plurality of picture blocks and K groups of probability values respectively corresponding to N samples of each of the plurality of picture blocks; and perform training based on the training dataset to obtain the neural network.

According to a fourth aspect, this application provides an entropy decoding apparatus, including: an obtaining module, configured to obtain a bit stream; and an entropy decoding module, configured to parse the bit stream to obtain base layer information and encoded data of a to-be-decoded picture block, where the base layer information corresponds to M samples in the picture block, the encoded data corresponds to enhancement layer information, the enhancement layer information corresponds to N samples in the picture block, both M and N are positive integers, and N≥M; input the base layer information into a neural network to obtain K groups of probability values, where the K groups of probability values correspond to K elements, any group of probability values is for representing probabilities of a plurality of candidate values of a corresponding element, and K is a positive integer; perform entropy decoding on the encoded data based on the K groups of probability values to obtain the K elements; and obtain reconstruction values of the N samples based on the K elements, where N is a positive integer.

In a possible implementation, when the K elements are K eigenvalues, the entropy decoding module is specifically configured to perform inverse feature extraction on the K eigenvalues to obtain the reconstruction values of the N samples.

In a possible implementation, when the K elements are K difference eigenvalues, the entropy decoding module is specifically configured to: perform inverse feature extraction on the K difference eigenvalues to obtain first differences of the N samples; parsing the bit stream to obtain reconstruction values of the M samples corresponding to the base layer information of the picture block, where N≥M; and obtain the reconstruction values of the N samples based on the reconstruction values of the M samples and the first differences of the N samples.

In a possible implementation, when the K elements are K transform value eigenvalues, the entropy decoding module is specifically configured to: perform inverse feature extraction on the K transform value eigenvalues to obtain transform values of the N samples; inversely transform the transform values of the N samples to obtain second differences of the N samples; parse the bit stream to obtain reconstruction values of the M samples corresponding to the base layer information of the picture block, where N≥M; obtain predicted values of the M samples based on the reconstruction values of the M samples; and obtain the reconstruction values of the N samples based on the predicted values of the M samples and the second differences of the N samples.

In a possible implementation, when the K elements include coordinates of a last non-zero value of transform values of the N samples, a first value of the transform values of the N samples, and all values between a second value of the quantized transform values of the N samples and the last non-zero value, the entropy decoding module is specifically configured to: perform inverse quantization based on the coordinates of the last non-zero value, the first value, and the all values to obtain the transform values of the N samples; inversely transform the transform values of the N samples to obtain second differences of the N samples; parse the bit stream to obtain reconstruction values of the M samples corresponding to the base layer information of the picture block, where N≥M; obtain predicted values of the M samples based on the reconstruction values of the M samples; and obtain the reconstruction values of the N samples based on the predicted values of the M samples and the second differences of the N samples.

In a possible implementation, the entropy decoding module is specifically configured to: when N≥M, perform interpolation on the reconstruction values of the M samples to obtain reconstruction values of the N samples; and perform a sum calculation based on the reconstruction values of the N samples and the first differences of the N samples to obtain reconstruction values of the N samples; or when N=M, perform a sum calculation based on the reconstruction values of the M samples and the first differences of the N samples to obtain reconstruction values of the N samples.

In a possible implementation, the entropy decoding module is specifically configured to: when N≥M, perform interpolation on the predicted values of the M samples to obtain predicted values of the N samples; and perform a sum calculation based on the predicted values of the N samples and the second differences of the N samples to obtain the reconstruction values of the N samples; or when N=M, perform a sum calculation based on the predicted values of the M samples and the second differences of the N samples to obtain reconstruction values of the N samples.

According to a fifth aspect, this application provides an encoder, including a processing circuit, configured to perform the method according to any one of the implementations of the first aspect.

According to a sixth aspect, this application provides a decoder, including a processing circuit, configured to perform the method according to any one of the implementations of the second aspect.

According to a seventh aspect, this application provides a computer program product, including program code for performing the method according to any one of the implementations of the first aspect and the second aspect when executed on a computer or a processor.

According to an eighth aspect, this application provides an encoder, including one or more processors; and a non-transitory computer-readable storage medium coupled to the processor and storing a program to be executed by the processor, where the program, when executed by the processor, enables the encoder to perform the method according to any one of the implementations of the first aspect.

According to a ninth aspect, this application provides a decoder, including: one or more processors; and a non-transitory computer-readable storage medium coupled to the processor and storing a program to be executed by the processor, where the program, when executed by the processor, enables the decoder to perform the method according to any one of the implementations of the second aspect.

According to a tenth aspect, this application provides a non-transitory computer-readable storage medium, including program code for performing the method according to any one of the implementations of the first and second aspects when executed by a computer device.

Details of one or more embodiments are set forth in the accompanying drawings and the description below. Other features, objects, and advantages are apparent from the description, drawings, and claims.

DESCRIPTION OF EMBODIMENTS

Figure 1A:
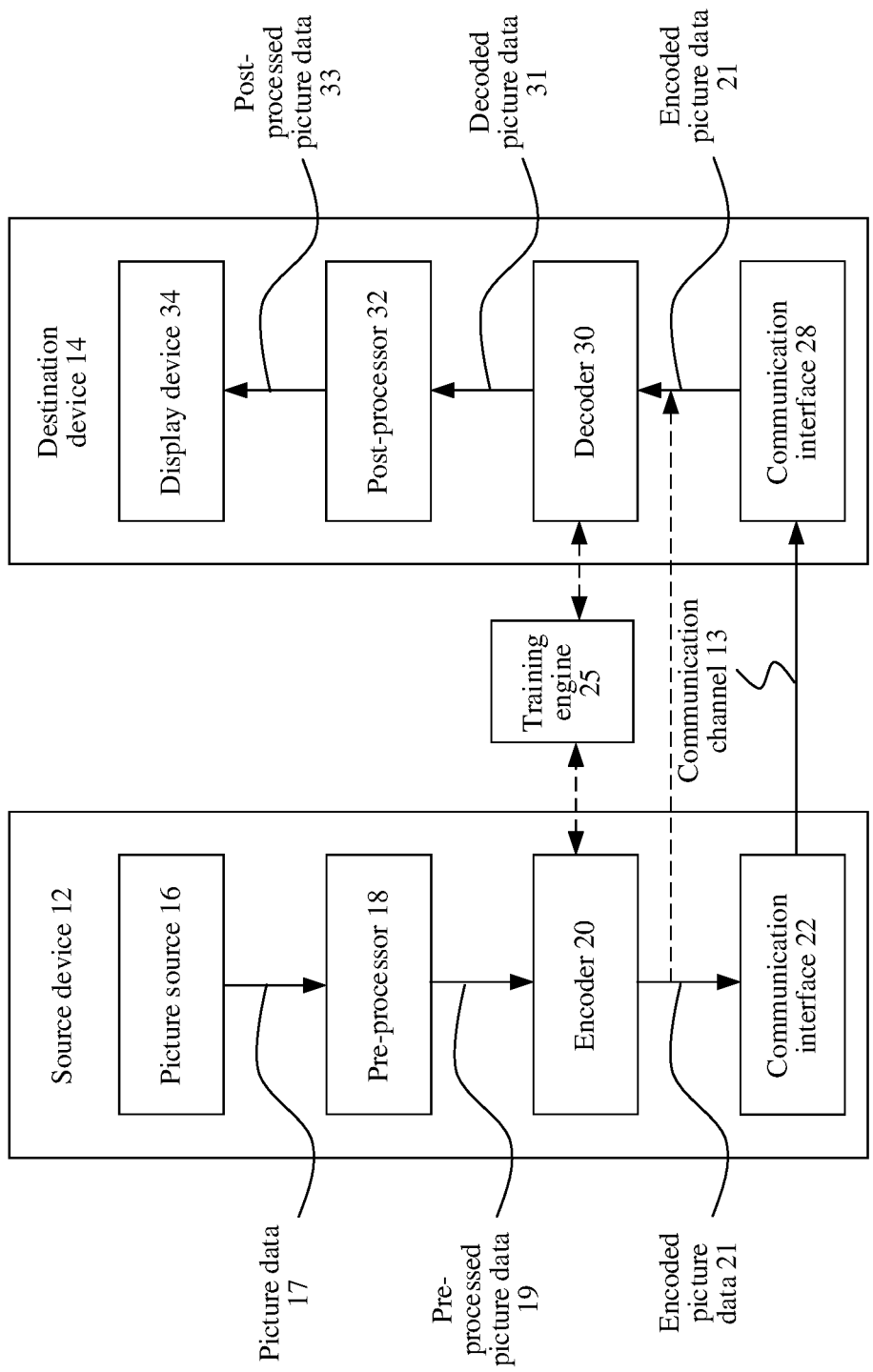
FIG. 1A is an example block diagram of a coding system 10 according to an embodiment of this application.

Embodiments of this application provide an AI-based video picture compression technology, and in particular, provide a neural network-based video compression technology, and specifically provide an NN-based entropy encoding/decoding technology, to improve a conventional hybrid video encoding/decoding system.

Video coding typically refers to processing of a sequence of pictures, where the sequence of pictures forms a video or a video sequence. In the field of video coding, the terms "picture", "frame", and "image" may be used as synonyms. Video coding (or coding in general) includes two parts video encoding and video decoding. Video encoding is performed at the source side, typically including processing (for example, by compression) the original video pictures to reduce the amount of data required for representing the video pictures (for more efficient storage and/or transmission). Video decoding is performed on a destination side, and typically includes inverse processing in comparison with processing of the encoder to reconstruct the video picture. Embodiments referring to "coding" of video pictures (or pictures in general) shall be understood to relate to "encoding" or "decoding" of video pictures or respective video sequences. A combination of an encoding part and a decoding part is also referred to as CODEC (encoding and decoding).

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several video coding standards are used for "lossy hybrid video coding" (that is, spatial and temporal prediction in a pixel domain is combined with 2D transform coding for applying quantization in a transform domain). Each picture of a video sequence is typically partitioned into a set of non-overlapping blocks, and coding is typically performed at a block level. To be specific, at an encoder, a video is usually processed, that is, encoded, at a block (e.g., video block) level. For example, a prediction block is generated through spatial (e.g., intra-picture) prediction and temporal (inter-picture) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. Furthermore, the encoder duplicates the decoder processing loop such that both generate identical predictions (for example, intra- and inter predictions) and/or re-construct pixels for processing, that is, coding, the subsequent blocks.

In the following embodiments of a video coding system 10, a video encoder 20 and a video decoder 30 are described based on FIG. 1A to FIG. 3.

FIG. 1A is a schematic block diagram illustrating an example coding system 10, for example, a video coding system 10 (or a coding system 10 for short) that may utilize techniques of this application. The video encoder 20 (or the encoder 20 for short) and the video decoder 30 (or the decoder 30 for short) of the video coding system 10 represent examples of devices that may be configured to perform techniques in accordance with various examples described in this application.

As shown in FIG. 1A, the coding system 10 includes a source device 12 configured to provide encoded picture data 21 for example, to a destination device 14 for decoding the encoded picture data 21.

The source device 12 includes an encoder 20, and may additionally, that is, optionally, include a picture source 16, a pre-processor (or pre-processing unit) 18, for example, a picture pre-processor, and a communication interface (or communication unit) 22.

The picture source 16 may include or be any type of picture capturing device, for example, a picture capturing device for capturing a real-world picture, and/or any type of picture generating device, for example, a computer-graphics processor for generating a computer animated picture, or any type of device for obtaining and/or providing a real-world picture, a computer generated picture (for example, a screen content, a virtual reality (VR) picture) and/or any combination thereof (for example, an augmented reality (AR) picture). The picture source may be any type of memory or storage storing any of the aforementioned pictures.

In distinction to the processing performed by the pre-processor (or the pre-processing unit) 18, the picture or picture data 17 may also be referred to as raw picture or raw picture data 17.

The pre-processor 18 is configured to receive the (raw) picture data 17 and to perform pre-processing on the picture data 17 to obtain a pre-processed picture (or pre-processed picture data) 19. Pre-processing performed by the pre-processor 18 may, for example, include trimming, color format conversion (for example, from RGB to YCbCr), color correction, or de-noising. It can be understood that the pre-processing unit 18 may be optional component.

The video encoder (or encoder) 20 is configured to receive the pre-processed picture data 19 and provide encoded picture data 21 (further details are described below, for example, based on FIG. 2).

The communication interface 22 of the source device 12 may be configured to receive the encoded picture data 21 and to transmit the encoded picture data 21 (or any further processed version thereof) over communication channel 13 to another device, for example, the destination device 14 or any other device, for storage or direct reconstruction.

The destination device 14 includes a decoder 30, and may additionally, that is, optionally, include a communication interface (or communication unit) 28, a post-processor (or post-processing unit 32) and a display device 34.

The communication interface 28 of the destination device 14 is configured to receive the encoded picture data 21 (or any further processed version thereof), for example, directly from the source device 12 or from any other source, for example, a storage device, for example, an encoded picture data storage device, and provide the encoded picture data 21 to the decoder 30.

The communication interface 22 and the communication interface 28 may be configured to transmit or receive the encoded picture data (or encoded data) 21 via a direct communication link between the source device 12 and the destination device 14, for example, a direct wired or wireless connection, or via any type of network, for example, a wired or wireless network or any combination thereof, or any type of private and public network, or any type of combination thereof.

The communication interface 22 may be, for example, configured to package the encoded picture data 21 into an appropriate format, for example, packets, and/or process the encoded picture data using any type of transmission encoding or processing for transmission over a communication link or communication network.

The communication interface 28, forming the counterpart of the communication interface 22, may be, for example, configured to receive the transmitted data and process the transmitted data using any type of corresponding transmission decoding or processing and/or de-packaging to obtain the encoded picture data 21.

Both a communication interface 22 and a communication interface 28 may be configured as unidirectional communication interfaces as indicated by the arrow for the communication channel 13 in FIG. 1A pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or a decoded picture) 31 (further details are described below, for example, based on FIG. 3).

The post-processor 32 is configured to post-process the decoded picture data 31 (also called reconstructed picture data), for example, the decoded picture, to obtain post-processed picture data 33, for example, a post-processed picture. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by display device 34.

The display device 34 is configured to receive the post-processed picture data 33 for displaying the picture, for example, to a user or viewer. The display device 34 may be or include any type of display for representing the reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

The coding system 10 further includes a training engine 25. The training engine 25 is configured to train the encoder 20 (especially an entropy encoding unit in the encoder 20) based on a training dataset, to process inputted base layer information of a picture, a picture area, or a picture block, to generate a probability value corresponding to enhancement layer information of the picture, the picture area, or the picture block.

The training dataset in this embodiment of this application may be stored in a database (not shown), and the training engine 25 obtains a target model (for example, may be a neural network for entropy encoding) by performing training based on the training dataset. It should be noted that a source of the training dataset is not limited in this embodiment of this application. For example, the training dataset may be obtained from a cloud or another place to perform model training.

The target model obtained by performing training by the training engine 25 may be applied to the coding system 10, for example, applied to the source device 12 (for example, the encoder 20) shown in FIG. 1A. The training engine 25 may obtain the target model by performing training on the cloud, and then the coding system 10 downloads the target model from the cloud and uses the target model. Alternatively, the training engine 25 may obtain the target model by performing training on the cloud and use the target model, and the coding system 10 obtains a processing result directly from the cloud. For example, the training engine 25 obtains the target model through training, the coding system 10 downloads the target model from the cloud, and then the entropy encoding unit 270 in the encoder 20 may process the inputted base layer information based on the target model to obtain a plurality of groups of probability values corresponding to the enhancement layer information, thereby implementing entropy encoding on the enhancement layer information. In another example, the training engine 25 obtains the target model through training, and the coding system 10 does not need to download the target model from the cloud. The encoder 20 transmits the base layer information to the cloud, and the cloud processes the base layer information by using the target model, completes entropy encoding on the enhancement layer information, and transmits the entropy-encoded enhancement layer information to the encoder 20.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments the source device 12 or corresponding functionality and the destination device 14 or corresponding functionality may be implemented using the same hardware and/or software or by separate hardware and/or software or any combination thereof.

As are apparent for the skilled person based on the description, the existence and (exact) split of functionalities of the different units or functionalities within the source device 12 and/or destination device 14 as shown in FIG. 1A may vary depending on the actual device and application.

Figure 1B:
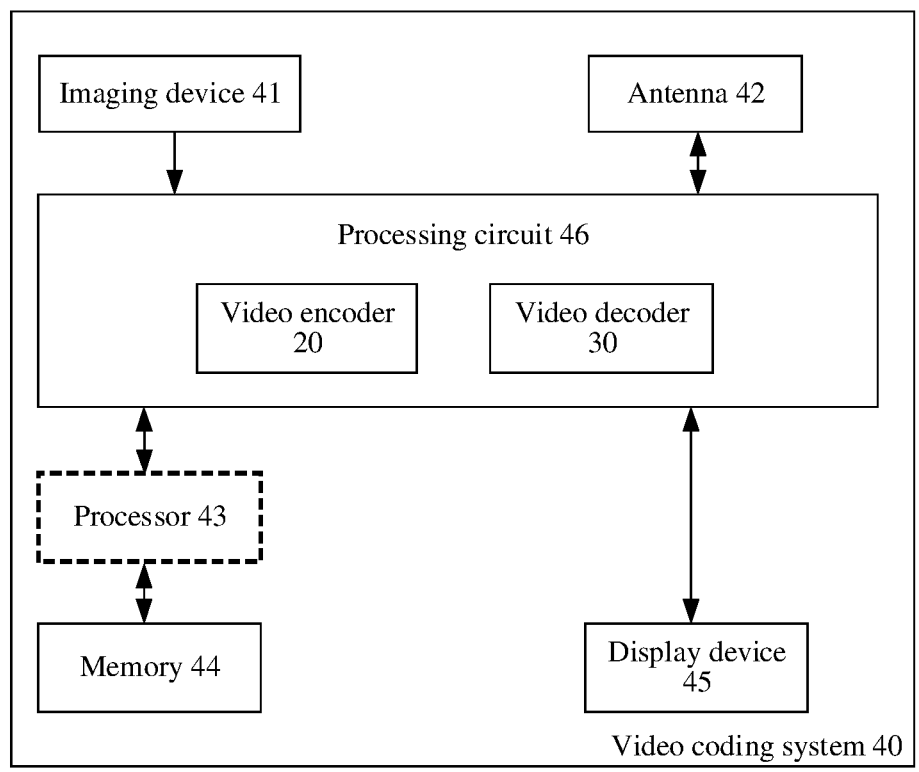
FIG. 1B is an example block diagram of a video coding system 40 according to an embodiment of this application.
Figure 5:
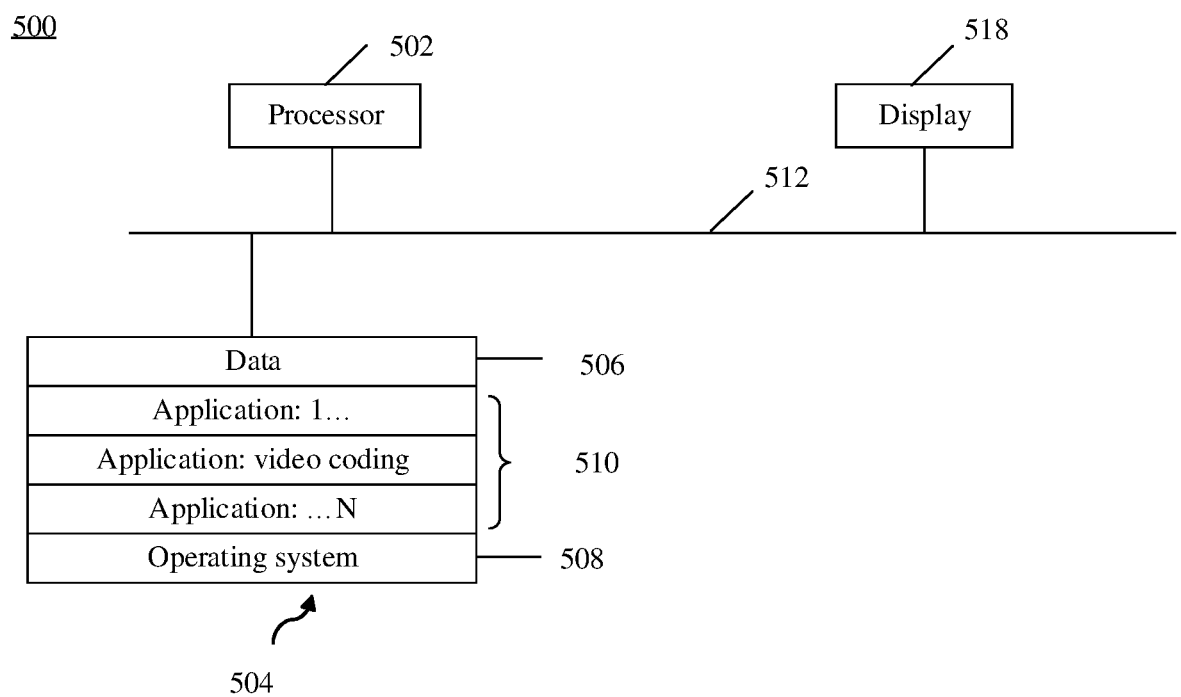
FIG. 5 is an example block diagram of an apparatus 500 according to an embodiment of this application.

The encoder 20 (for example, the video encoder 20) or the decoder 30 (for example, the video decoder 30) or both the encoder 20 and the decoder 30 may be implemented via processing circuit as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via a processing circuit 46 to embody the various modules as discussed with respect to the encoder 20 of FIG. 2 and/or any other encoder system or subsystem described herein. The decoder 30 may be implemented via the processing circuit 46 to embody the various modules as discussed with respect to the decoder 30 of FIG. 3 and/or any other decoder system or subsystem described herein. The processing circuit 46 may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of the present technology. Either of the video encoder 20 and the video decoder 30 may be integrated as part of a combined encoder/decoder (CODEC) in a single device, for example, as shown in FIG. 1B.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any type of operating system. In some cases, the source device 12 and the destination device 14 may be equipped with components for wireless communication. Therefore, the source device 12 and the destination device 14 may be wireless communication devices.

In some cases, the video coding system 10 illustrated in FIG. 1A is merely an example and the techniques of this application may apply to video coding settings (for example, video encoding or video decoding) that do not necessarily include any data communication between the encoding and decoding devices. In other examples, data is retrieved from a local memory, streamed over a network, or the like. A video encoding device may encode data and store encoded data into the memory, and/or a video decoding device may retrieve data from the memory and decode the data. In some examples, the encoding and decoding are performed by devices that do not communicate with one another, but simply encode data to memory and/or retrieve and decode data from memory.

Figure 2:
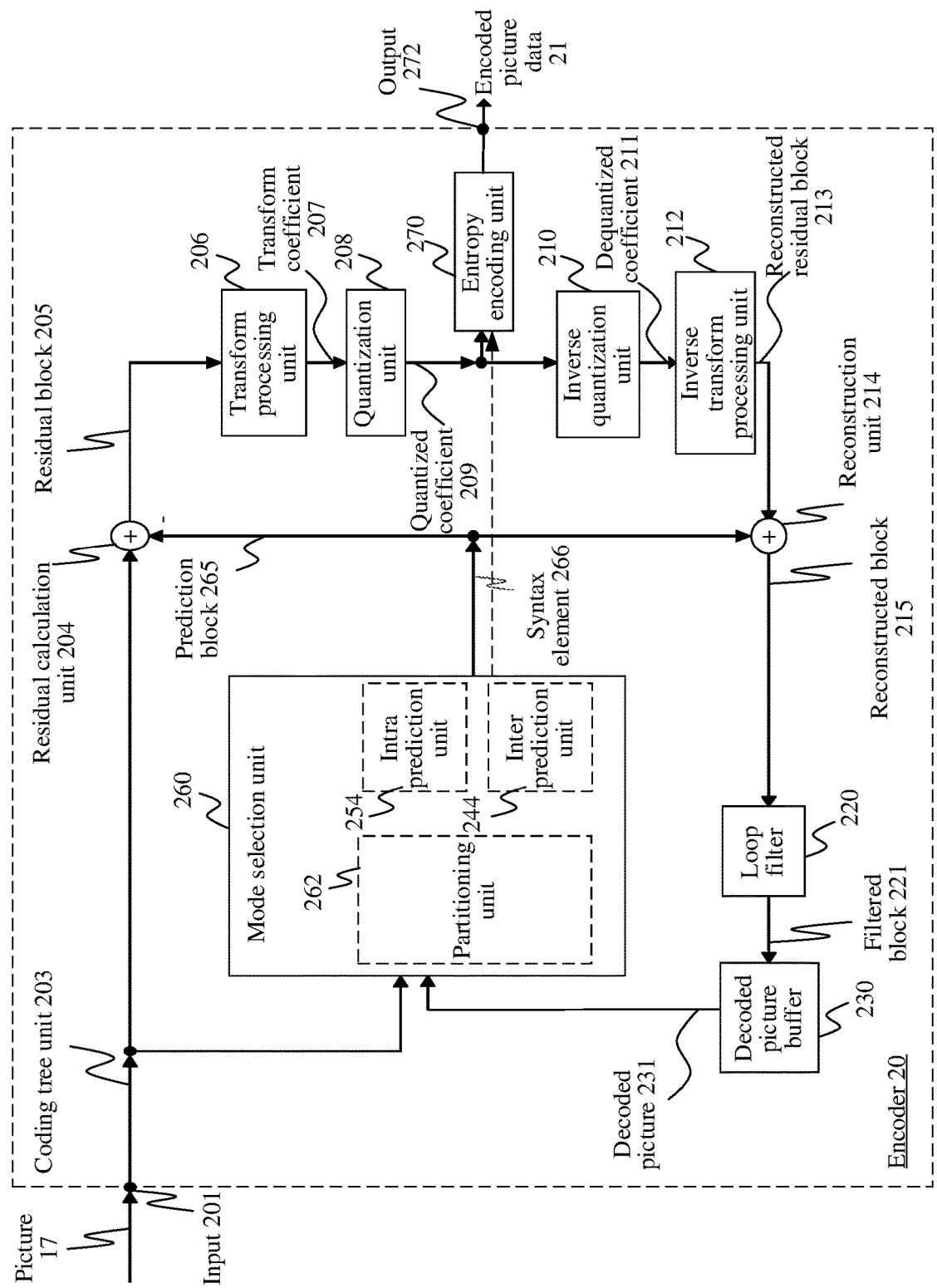
FIG. 2 is an example block diagram of a video encoder 20 according to an embodiment of this application.
Figure 3:
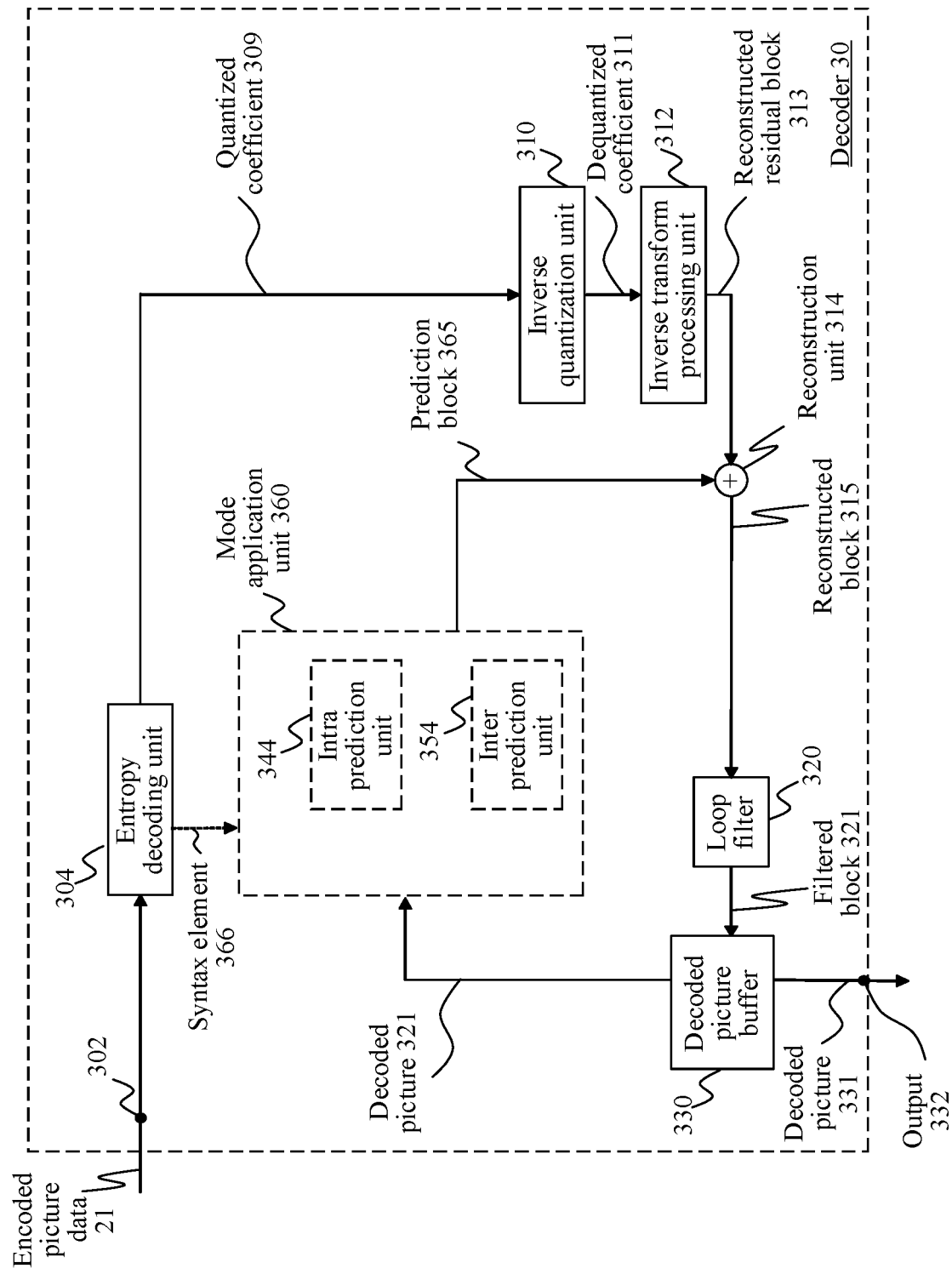
FIG. 3 is an example block diagram of a video decoder 30 according to an embodiment of this application.

FIG. 1B is an illustrative diagram of an example of a video coding system 40, including the encoder 20 in FIG. 2 and/or the decoder 30 in FIG. 3, according to an example embodiment. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 1B, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bit stream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processor, a general-purpose processor, or the like. In addition, the memory 44 may be a memory of any type, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by using the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may include video encoder 20 as implemented via logic circuitry 46 to embody the various modules as discussed with respect to FIG. 2 and/or any other encoder system or subsystem described herein. The logic circuit may be configured to perform various operations described in this specification.

In some examples, the decoder 30 may be implemented by the processing circuit 46 in a similar manner, to implement various modules that are described with reference to the decoder 30 in FIG. 3 and/or any other decoder system or subsystem described in this specification. In some examples, the video decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may include video decoder 30 as implemented via logic circuitry 46 to embody the various modules as discussed with respect to FIG. 3 and/or any other decoder system or subsystem described herein.

In some examples, the antenna 42 may be configured to receive an encoded bit stream of video data. As described, the encoded bit stream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bit stream. The display device 45 is configured to present a video frame.

It should be understood that in this embodiment of this application, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into an encoded video bit stream. In such examples, the video decoder 30 may parse such syntax element and decode the associated video data accordingly.

For convenience of description, embodiments of the present technology are described herein, for example, by reference to High-Efficiency Video Coding (HEVC) or to the reference software of Versatile Video Coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art should understand that embodiments of the present technology are not limited to HEVC or VVC.

Encoder and Encoding Method

FIG. 2 is a schematic block diagram of an example of a video encoder 20 that is configured to implement the techniques of this application. In the example of FIG. 2, the video encoder 20 includes an input (or input interface 201), a residual calculation unit 204, a transform processing unit 206, a quantization unit 208, an inverse quantization unit 210, and inverse transform processing unit 212, a reconstruction unit 214, a loop filter 220, a decoded picture buffer (DPB) 230, a mode selection unit 260, an entropy encoding unit 270, and an output (or output interface 272). The mode selection unit 260 may include an inter prediction unit 244, an intra prediction unit 254 and a partitioning unit 262. The inter prediction unit 244 may include a motion estimation unit and a motion compensation unit (not shown). The encoder 20 shown in FIG. 2 may also be referred to as a hybrid video encoder or a video encoder based on a hybrid video codec.

Referring to FIG. 2, the entropy encoding unit 270 includes a trained target model (also referred to as a neural network), where the neural network is configured to process inputted base layer information of a picture, a picture area, or a picture block, to generate a probability value corresponding to enhancement layer information of the picture, the picture area, or the picture block. For example, a neural network for entropy coding is configured to receive inputted base layer information of a picture, a picture area, or a picture block, and generate a plurality of groups of probability values corresponding to inputted enhancement layer information of the picture, the picture area, or the picture block.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 230, the loop filter 220, the decoded picture buffer (decoded picture buffer, DPB) 230, the inter prediction unit 244 and the intra prediction unit 254 may be referred to as forming a backward signal path of the encoder, where the backward signal path of the video encoder 20 corresponds to the signal path of the decoder (see the decoder 30 in FIG. 3). The inverse quantization unit 210, the inverse transform processing unit 212, the reconstruction unit 214, the loop filter 220, the decoded picture buffer 230, the inter prediction unit 244, and the intra prediction unit 254 are also referred to as forming the "built-in decoder" of the video encoder 20.

Pictures & Picture Partitioning (Pictures & Blocks)

The encoder 20 may be configured to receive, for example, via the input 201, a picture (or picture data) 17, for example, a picture in a sequence of pictures forming a video or video sequence. The received picture or picture data may also be a pre-processed picture (or pre-processed picture data) 19. For ease of simplicity, the following description refers to the picture 17. The picture 17 may also be referred to as current picture or picture to be coded (in particular in video coding to distinguish the current picture from other pictures, for example, previously encoded and/or decoded pictures of the same video sequence, that is, the video sequence which also includes the current picture).

A (digital) picture is or can be regarded as a two-dimensional array or matrix of samples with intensity values. A sample in the array may also be referred to as pixel or pel (short form of picture element). A quantity of samples in horizontal and vertical direction (or axis) of the array or picture defines the size and/or resolution of the picture. For representation of color, three color components are usually employed, to be specific, the picture may be represented as or include three sample arrays. In RBG format or color space a picture includes a corresponding red, green and blue sample array. However, in video coding, each pixel is typically represented in a luminance and chrominance format or color space, for example, YCbCr, which includes a luminance component indicated by Y (sometimes also L is used instead) and two chrominance components indicated by Cb and Cr. The luminance (luma) component Y represents the brightness or gray level intensity (for example, like in a gray-scale picture), while the two chrominance (chrominance, or short chroma) components Cb and Cr represent the chromaticity or color information components. Accordingly, a picture in YCbCr format includes a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may include only a luminance sample array. Accordingly, a picture may be, for example, an array of luma samples in monochrome format or an array of luma samples and two corresponding arrays of chroma samples in 4:2:0, 4:2:2, and 4:4:4 color format.

In an embodiment, the video encoder 20 may include a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) in H.265/HEVC and VVC. The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, for example, one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may include, for example, one sample array (for example, a luma array in case of a monochrome picture 17, or a luma or chroma array in case of a color picture) or three sample arrays (for example, a luma and two chroma arrays in case of a color picture 17) or any other number and/or type of arrays depending on the color format applied. The numbers of samples in horizontal and vertical direction (or axis) of the block 203 define the size of block 203. Accordingly, a block may, for example, an M×N (M-column by N-row) array of samples, or an M×N array of transform coefficients.

In an embodiment, the video encoder 20 shown in FIG. 2 is configured to encode the picture 17 block by block, for example, the encoding and prediction is performed per block 203.

In an embodiment, the video encoder 20 shown in FIG. 2 may be further configured to partition and/or encode the picture by using slices (also referred to as video slices), where a picture may be partitioned or encoded using one or more slices (typically non-overlapping). Each slice may include one or more blocks (for example, CTUs) or one or more groups of blocks (for example, tiles in H.265/HEVC and VVC or bricks in VVC).

In an embodiment, the video encoder 20 as shown in FIG. 2 may be further configured to partition and/or encode the picture by using slices/tile groups (also referred to as video tile groups) and/or tiles (also referred to as video tiles), where a picture may be partitioned or encoded using one or more slices/tile groups (typically non-overlapping), and each slice/tile group may include, for example, one or more blocks (for example, CTUs) or one or more tiles, where each tile, for example, may be of rectangular shape and may include one or more blocks (for example, CTUs), for example, complete or fractional blocks.

Residual Calculation

The residual calculation unit 204 may be configured to calculate a residual block 205 based on the picture block 203 and a prediction block 265 (further details about the prediction block 265 are provided later), for example, by subtracting sample values of the prediction block 265 from sample values of the picture block 203, sample by sample (e.g., pixel by pixel) to obtain the residual block 205 in the pixel domain.

Transform

The transform processing unit 206 may be configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of 2 for a shift operation, a bit depth of the transform coefficient, and a tradeoff between accuracy and implementation costs. A specific scaling factor is, for example, specified for an inverse transform, for example, by the inverse transform processing unit 212 on the encoder side 20 (and the corresponding inverse transform, for example, by the inverse transform processing unit 312 on the decoder side 30), and a corresponding scaling factor for the forward transform, for example, by the transform processing unit 206 on the encoder side 20 may be specified accordingly.

In an embodiment, the video encoder 20 (correspondingly, the transform processing unit 206) may be configured to output transform parameters, for example, a type of transform or transforms, for example, directly or encoded or compressed via the entropy encoding unit 270, so that, for example, the video decoder 30 may receive and use the transform parameters for decoding.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), or vice versa. The quantization may include division by a quantization step size and a corresponding and/or the inverse dequantization, for example, by inverse quantization unit 210, may include multiplication by the quantization step size. Embodiments according to some standards, for example, HEVC, may be configured to use a quantization parameter to determine the quantization step size. Generally, the quantization step size may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step size and the quantization parameter. In one example implementation, the scaling of the inverse transform and dequantization might be combined. Alternatively, customized quantization tables may be used and signaled from an encoder to a decoder, for example, in a bit stream. The quantization is a lossy operation, where the loss increases with increasing of the quantization step size.

In an embodiment, the video encoder 20 (correspondingly, the quantization unit 208) may be configured to output quantization parameters (QP), for example, directly or encoded via the entropy encoding unit 270, so that, for example, the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, for example, by applying the inverse quantization scheme of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply an inverse transform of the transform applied by the transform processing unit 206, for example, an inverse discrete cosine transform (DCT) or inverse discrete sine transform (DST), to obtain a reconstructed residual block 213 (or corresponding dequantized coefficients 211) in the pixel domain. The reconstructed residual block 213 may also be referred to as transform block 213.

Reconstruction

The reconstruction unit 214 (for example, summer 214) is configured to add the transform block 213 (for example, reconstructed residual block 213) to the prediction block 265 to obtain a reconstructed block 215 in the pixel domain, for example, by adding the sample values of the reconstructed residual block 213 and the sample values of the prediction block 265.

Filtering

The loop filter unit 220 (or "loop filter" 220 for short) is configured to filter the reconstructed block 215 to obtain a filtered block 221, or is generally configured to filter the reconstructed sample to obtain a filtered sample value. The loop filter unit is, for example, configured to smooth pixel transitions, or otherwise improve the video quality. The loop filter unit 220 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. The order of the filtering process may be the deblocking filter, the SAO filter, and the ALF filter. In another example, a process called the luma mapping with chroma scaling (LMCS) (namely, an adaptive in-loop reshaper) is added. This process is performed before deblocking. In another example, the deblocking filter process may be also applied to internal sub-block edges, for example, affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

In an embodiment, the video encoder 20 (correspondingly, the loop filter unit 220) may be configured to output loop filter parameters (such as SAO filter parameters, ALF filter parameters, or LMCS parameters), for example, directly or encoded via the entropy encoding unit 270, so that, for example, a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer 230 may be configured to store one or more filtered blocks 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, for example, decoded, pictures (and corresponding reference blocks and samples) and/or a partially reconstructed current picture (and corresponding reference blocks and samples), for example, for inter prediction. The decoded picture buffer 230 may be further configured to store one or more unfiltered reconstructed blocks 215, or in general unfiltered reconstructed samples, for example, if the reconstructed block 215 is not filtered by loop filter unit 220, or any other further processed version of the reconstructed blocks or samples.

Mode Selection (Partitioning and Prediction)

The mode selection unit 260 includes a partitioning unit 262, an inter prediction unit 244, and an intra prediction unit 254, and is configured to receive or obtain original picture data, for example, an original block 203 (the current block 203 of the current picture 17), and reconstructed picture data, for example, filtered and/or unfiltered reconstructed samples or blocks of the same (current) picture and/or from one or more previously decoded pictures, for example, from decoded picture buffer 230 or other buffers (for example, line buffer, not shown). The reconstructed picture data is used as reference picture data for prediction, for example, inter prediction or intra prediction, to obtain a prediction block 265 or predicted value 265.

The mode selection unit 260 may be configured to determine or select a partitioning for a current block prediction mode (including no partitioning) and a prediction mode (for example, an intra or inter prediction mode) and generate a corresponding prediction block 265, which is used for the calculation of the residual block 205 and for the reconstruction of the reconstructed block 215.

In an embodiment, the mode selection unit 260 may be configured to select the partitioning and prediction mode (for example, from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), for example, select the prediction mode which provides a minimum rate distortion optimization. Terms such as "best", "lowest", and "optimal" in this specification do not necessarily refer to "best", "lowest", and "optimal" in general, but may also refer to a case in which a termination or selection criterion is satisfied. For example, a value exceeding or below a threshold or other limitations may result in a "suboptimal selection", but complexity and processing time are reduced.

In other words, the partitioning unit 262 may be configured to partition a picture from a video sequence into a sequence of coding tree units (CTUs), and the CTU 203 may be further partitioned into smaller block partitions or sub-blocks (which form again blocks), for example, iteratively using quad-tree partitioning (QT), binary-tree partitioning (BT) or ternary-tree partitioning (TT) or any combination thereof, and to perform, for example, the prediction for each of the block partitions or sub-blocks, where the mode selection includes the selection of the tree-structure of the partitioned block 203 and the prediction modes are applied to each of the block partitions or sub-blocks.

In the following partitioning (for example, by partitioning unit 262) and prediction processing (by inter prediction unit 244 and intra prediction unit 254) performed by an example video encoder 20 are explained in more detail.

Partitioning

The partitioning unit 262 may partition (or split) a coding tree unit 203 into smaller partitions, for example, smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256× 256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, where a root block, for example, at root tree-level 0 (hierarchy-level 0, depth 0), may be recursively partitioned, for example, partitioned into two or more blocks of a next lower tree-level, for example, nodes at tree-level 1 (hierarchy-level 1, depth 1). These blocks may be again partitioned into two or more blocks of a next lower level, for example, tree-level 2 (hierarchy-level 2, depth 2), and the like, until the partitioning is terminated (for example, because a termination criterion is fulfilled, for example, a maximum tree depth or minimum block size is reached). Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or include a CTB of luma samples, two corresponding CTBs of chroma samples of a picture that has three sample arrays, or a CTB of samples of a monochrome picture or a picture that is coded using three separate color planes and syntax structures (used to code the samples). Correspondingly, a coding tree block (CTB) may be an N×N block of samples for some value of N such that the splitting of a component into CTBs is a partitioning. A coding unit (CU) may be or include a coding block of luma samples, two corresponding coding blocks of chroma samples of a picture that has three sample arrays, or a coding block of samples of a monochrome picture or a picture that is coded using three separate color planes and syntax structures (used to code the samples). Correspondingly, a coding block (CB) may be an M×N block of samples for some values of M and N such that the splitting of a CTB into coding blocks is a partitioning.

In embodiments, for example, according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs based on the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quad-tree structure similar to the coding tree for the CU.

In embodiments, for example, based on the latest video coding standard currently in development, which is referred to as Versatile Video Coding (VVC), a combined quad-tree using nested multi-type trees (for example, a binary-tree and a ternary-tree) splits a segmentation structure used to partition a coding tree unit. In the coding tree structure within a coding tree unit, a CU can have either a square or rectangular shape. For example, the coding tree unit (CTU) is first partitioned by a quad-tree. Then the quad-tree leaf nodes can be further partitioned by a multi-type tree structure. There are four splitting types in multi-type tree structure, vertical binary-tree splitting (SPLIT_BT_VER), horizontal binary-tree splitting (SPLIT_BT_HOR), vertical ternary-tree splitting (SPLIT_TT_VER), and horizontal ternary-tree splitting (SPLIT_TT_HOR). The multi-type tree leaf nodes are called coding units (CUs), and unless the CU is excessively large for the maximum transform length, this segmentation is used for prediction and transform processing without any further partitioning. This means that, in most cases, the CU, PU and TU have the same block size in the quad-tree with nested multi-type tree coding block structure. The exception occurs when maximum supported transform length is smaller than the width or height of the color component of the CU. VVC develops a unique signaling mechanism of the partition splitting information in quad-tree with nested multi-type tree coding tree structure. In the signaling mechanism, a coding tree unit (CTU) is treated as the root of a quad-tree and is first partitioned by a quad-tree structure. Each quad-tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary-tree split or a ternary-tree split. Based on the values of mtt_split_cu_vertical_flag and mtt_split_cu_binary_flag, the multi-type tree splitting mode (MttSplitMode) of a CU can be derived by a decoder based on a predefined rule or a table. It should be noted that, for a type of design, for example, 64×64 luma block and 32×32 chroma pipelining design in VVC hardware decoders, when a width or a height of a luma coding block is greater than 64, TT splitting is not allowed. TT split is also forbidden when either width or height of a chroma coding block is larger than 32. The pipelining design divides a picture into virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (transform block, TB) size. However, in VVC, ternary-tree (TT) and binary-tree (BT) partition may lead to the increasing of VPDU sizes.

In addition, it should be noted that, when a portion of a tree node block exceeds the bottom or right picture boundary, the tree node block is forced to be split until the all samples of every coded CU are located inside the picture boundaries.

In an example, the intra sub-partition (intra sub-partition, ISP) tool may divide luma intra-predicted blocks vertically or horizontally into two or four sub-partitions depending on the block size.

In one example, the mode selection unit 260 of the video encoder 20 may be configured to perform any combination of the partitioning techniques described herein.

As described above, the video encoder 20 is configured to determine or select the best or an optimum prediction mode from a set of (for example, pre-determined) prediction modes. The set of prediction modes may include, for example, intra prediction modes and/or inter prediction modes.

Intra Prediction

A set of intra prediction modes may include 35 different intra prediction modes, for example, non-directional modes such as a DC (or average) mode and a planar mode, or directional modes such as those defined in HEVC, or may include 67 different intra prediction modes, for example, non-directional modes such as a DC (or average) mode and a planar mode, or directional modes such as those defined in VVC. In an example, several conventional angular intra prediction modes are adaptively replaced with wide-angle intra prediction modes for the non-square blocks, for example, as defined in VVC. In another example, to avoid division operations for DC prediction, only the longer side is used to compute the average for non-square blocks. In addition, the results of intra prediction of planar mode may be further modified by a position dependent intra prediction combination (PDPC) method.

The intra prediction unit 254 is configured to use reconstructed samples of neighboring blocks of the same current picture to generate an intra prediction block 265 according to an intra prediction mode of the set of intra prediction modes.

The intra prediction unit 254 (or in general the mode selection unit 260) is further configured to output intra prediction parameters (or in general information indicative of the selected intra prediction mode for the block) to the entropy encoding unit 270 in form of syntax elements 266 for inclusion into the encoded picture data 21, so that, for example, the video decoder 30 may receive and use the prediction parameters for decoding.

Inter Prediction

In a possible implementation, the set of (or possible) inter prediction modes depends on the available reference pictures (that is, previous at least partially decoded pictures, for example, stored in the DPB 230) and other inter prediction parameters, for example, whether the whole reference picture or only a part, for example, a search window area around the area of the current block, of the reference picture is used for searching for a best matching reference block, and/or for example, whether sample interpolation is applied, for example, half/semi-pel, quarter-pel and/or 1/16 pel interpolation, or not.

In addition to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP, and Zero MVs. A bilateral-matching based decoder side motion vector refinement (DMVR) may be applied to increase the accuracy of the MVs of the merge mode. Merge mode with MVD (MMVD), which comes from merge mode with motion vector differences. An MMVD flag is signaled right after sending a skip flag and merge flag to specify whether MMVD mode is used for a CU. A CU-level adaptive motion vector resolution (AMVR) scheme may be applied. AMVR allows MVD of the CU to be coded in different precision. Dependent on the prediction mode for the current CU, the MVDs of the current CU might be adaptively selected. When a CU is coded in merge mode, the combined inter/intra prediction (CIIP) mode may be applied to the current CU. Weighted averaging is performed on the inter prediction and intra prediction signals to obtain the CIIP prediction. Affine motion compensated prediction, the affine motion field of the block is described by motion information of two-control-point (4-parameter) or three-control-point (6-parameter) motion vectors. Subblock-based temporal motion vector prediction (SbTMVP), which is similar to the temporal motion vector prediction (temporal motion vector prediction, TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded pictures 231, or in other words, the current picture and the previously decoded pictures 231 may be part of or form a sequence of pictures forming a video sequence.

The encoder 20 may, for example, be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, for example, receive, an inter prediction parameter and perform inter prediction based on or using the inter prediction parameter to obtain an inter prediction block 246. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (for example, a variable length coding (VLC) scheme, a context adaptive VLC (CAVLC) scheme, an arithmetic coding scheme, a binarization algorithm, a context adaptive binary arithmetic coding (CABAC), syntax-based context-adaptive binary arithmetic coding (SBAC), probability interval partitioning entropy (PIPE) coding, or another entropy encoding methodology or technique) or bypass (no compression) to the quantized residual coefficients 209, inter prediction parameters, intra prediction parameters, loop filter parameters, and/or other syntax elements to obtain encoded picture data 21 which can be outputted via the output 272, for example, in the form of an encoded bit stream 21, so that, for example, the video decoder 30 may receive and use the parameters for decoding. The encoded bit stream 21 may be transmitted to video decoder 30, or stored in a memory for later transmission or retrieval by video decoder 30.

Other structural variations of the video encoder 20 can be used to encode the video stream. For example, a non-transform based encoder 20 may quantize a residual signal directly without the transform processing unit 206 for some blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this application. The video decoder 30 is configured to receive encoded picture data 21 (for example, encoded bit stream 21), for example, encoded by an encoder 20, to obtain a decoded picture 331. The encoded picture data or bit stream includes information for decoding the encoded picture data, for example, data that represents picture blocks of an encoded video slice (and/or tile groups or tiles) and associated syntax elements.

In the example of FIG. 3, the decoder 30 includes an entropy decoding unit 304, an inverse quantization unit 310, an inverse transform processing unit 312, a reconstruction unit 314 (for example, a summer 314), a loop filter 320, a decoded picture buffer (DBP) 330, a mode application unit 360, an inter prediction unit 354, and an intra prediction unit 344. The inter prediction unit 354 may be or include a motion compensation unit. The video decoder 30 may, in some examples, perform a decoding pass generally reciprocal to the encoding pass described with respect to the video encoder 100 from FIG. 2.

As explained with regard to the encoder 20, the inverse quantization unit 210, the inverse transform processing unit 212, the reconstruction unit 214, the loop filter 220, the decoded picture buffer DPB 230, the inter prediction unit 354, and the intra prediction unit 344 are also referred to as forming the "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bit stream 21 (or in general encoded picture data 21) and perform entropy decoding on the encoded picture data 21 to obtain quantized coefficients 309 and/or decoded coding parameters (not shown in FIG. 3), for example, any one or all of inter prediction parameters (for example, reference picture index and motion vector), intra prediction parameter (for example, intra prediction mode or index), transform parameters, quantization parameters, loop filter parameters, and/or other syntax elements. The entropy decoding unit 304 may be configured to apply the decoding algorithms or schemes corresponding to the encoding schemes as described with regard to the entropy encoding unit 270 of the encoder 20. The entropy decoding unit 304 may be further configured to provide inter prediction parameters, intra prediction parameter and/or other syntax elements to the mode application unit 360 and other parameters to other units of the decoder 30. The video decoder 30 may receive the syntax elements at the video slice level and/or the video block level. In addition or as an alternative to slices and respective syntax elements, tile groups and/or tiles and respective syntax elements may be received or used.

Inverse Quantization

The inverse quantization unit 310 may be configured to receive quantization parameters (QP) (or in general information related to the inverse quantization) and quantized coefficients from the encoded picture data 21 (for example, by parsing and/or decoding, for example, by entropy decoding unit 304) and to apply based on the quantization parameters an inverse quantization on the decoded quantized coefficients 309 to obtain dequantized coefficients 311. The dequantized coefficients 311 may also be referred to as transform coefficients 311. The inverse quantization process may include use of a quantization parameter determined by the video encoder 20 for each video block in the video slice (or picture block or picture block group) to determine a degree of quantization and, likewise, a degree of inverse quantization that should be applied.

Inverse Transform

The inverse transform processing unit 312 may be configured to receive dequantized coefficients 311, also referred to as transform coefficients 311, and to apply a transform to the dequantized coefficients 311 in order to obtain reconstructed residual blocks 313 in the pixel domain. The reconstructed residual block 213 may also be referred to as transform block 313. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding, for example, by entropy decoding unit 304) to determine the transform to be applied to the dequantized coefficients 311.

Reconstruction

The reconstruction unit 314 (for example, summer 314) is configured to add the reconstructed residual block 313 to the prediction block 365 to obtain a reconstructed block 315 in the pixel domain, for example, by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, for example, to smooth pixel transitions, or otherwise improve the video quality. The loop filter unit 320 may include one or more loop filters such as a deblocking filter, a sample-adaptive offset (SAO) filter or one or more other filters, for example, an adaptive loop filter (ALF), a noise suppression filter (NSF), or any combination thereof. In an example, the loop filter unit 220 may include a deblocking filter, a SAO filter and an ALF filter. The order of the filtering process may be the deblocking filter, the SAO filter, and the ALF filter. In another example, a process called the luma mapping with chroma scaling (LMCS) (namely, an adaptive in-loop reshaper) is added. This process is performed before deblocking. In another example, the deblocking filter process may be also applied to internal sub-block edges, for example, affine sub-blocks edges, ATMVP sub-blocks edges, sub-block transform (SBT) edges and intra subpartition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in a decoded picture buffer 330, and the decoded picture buffer 330 stores the decoded pictures 331 as reference pictures for subsequent motion compensation for other pictures and/or for output respectively display.

The decoder 30 is configured to output the decoded picture 331, for example, via an output 312, for presentation or viewing to a user.

Prediction

The inter prediction unit 354 may be identical to the inter prediction unit 244 (in particular to the motion compensation unit) and the intra prediction unit 344 may be identical to the intra prediction unit 254 in function, and performs split or partitioning decisions and prediction based on the partitioning and/or prediction parameters or respective information received from the encoded picture data 21 (for example, by parsing and/or decoding, for example, by entropy decoding unit 304). The mode application unit 360 may be configured to perform the prediction (intra or inter prediction) per block based on reconstructed pictures, blocks, or corresponding samples (filtered or unfiltered) to obtain the prediction block 365.

When the video slice is coded as an intra coded (I) slice, intra prediction unit 344 of mode application unit 360 is configured to generate prediction block 365 for a picture block of the current video slice based on a signaled intra prediction mode and data from previously decoded blocks of the current picture. When the video picture is coded as an inter coded (for example, B, or P) slice, inter prediction unit 354 (for example, motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. The video decoder 30 may construct the reference frame lists, a list 0 and a list 1, using default construction techniques based on reference pictures stored in the DPB 330. The same or similar may be applied for or by embodiments using tile groups (for example, video tile groups) and/or tiles (for example, video tiles) in addition or alternatively to slices (for example, video slices), for example, a video may be coded using I, P or B tile groups and/or tiles.

The mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (for example, intra or inter prediction) used to code the video blocks of the video slice, an inter prediction slice type (for example, B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (for example, video tile groups) and/or tiles (for example, video tiles) in addition or alternatively to slices (for example, video slices), for example, a video may be coded using I, P or B tile groups and/or tiles.

In an embodiment, the video decoder 30 shown in FIG. 3 may be further configured to partition and/or decode the picture by using slices (also referred to as video slices), where a picture may be partitioned or decoded using one or more slices (typically non-overlapping). Each slice may include one or more blocks (for example, CTUs) or one or more groups of blocks (for example, tiles in H.265/HEVC and VVC or bricks in VVC).

In an embodiment, the video decoder 30 as shown in FIG. 3 may be further configured to partition and/or decode the picture by using slices/tile groups (also referred to as video tile groups) and/or tiles (also referred to as video tiles), where a picture may be partitioned or decoded using one or more slices/tile groups (typically non-overlapping), and each slice/tile group may include, for example, one or more blocks (for example, CTUs) or one or more tiles, where each tile, for example, may be of rectangular shape and may include one or more blocks (for example, CTUs), for example, complete or fractional blocks.

Other variations of the video decoder 30 can be used to decode the encoded picture data 21. For example, the decoder 30 can produce the output video stream without the loop filter unit 320. For example, a non-transform based decoder 30 can inversely quantize the residual signal directly without the inverse transform processing unit 312 for some blocks or frames. In another implementation, the video decoder 30 can have the inverse quantization unit 310 and the inverse transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as clip or shift, may be performed on the processing result of the interpolation filtering, motion vector derivation or loop filtering.

Although embodiments of the present technology have been primarily described based on video coding, it should be noted that embodiments of the coding system 10, the encoder 20 and the decoder 30 and the other embodiments described herein may also be configured for still picture processing or coding, that is, the processing or coding of an individual picture independent of any preceding or consecutive picture as in video coding. In general only inter prediction units 244 (encoder) and 354 (decoder) may not be available in case the picture processing coding is limited to a single picture 17. All other functionalities (also referred to as tools or technologies) of the video encoder 20 and video decoder 30 may equally be used for still picture processing, for example, residual calculation 204/304, transform 206, quantization 208, inverse quantization 210/310, (inverse) transform 212/312, partitioning 262/362, intra prediction 254/344, and/or loop filtering 220/320, and entropy coding 270 and entropy decoding 304.

Figure 4:
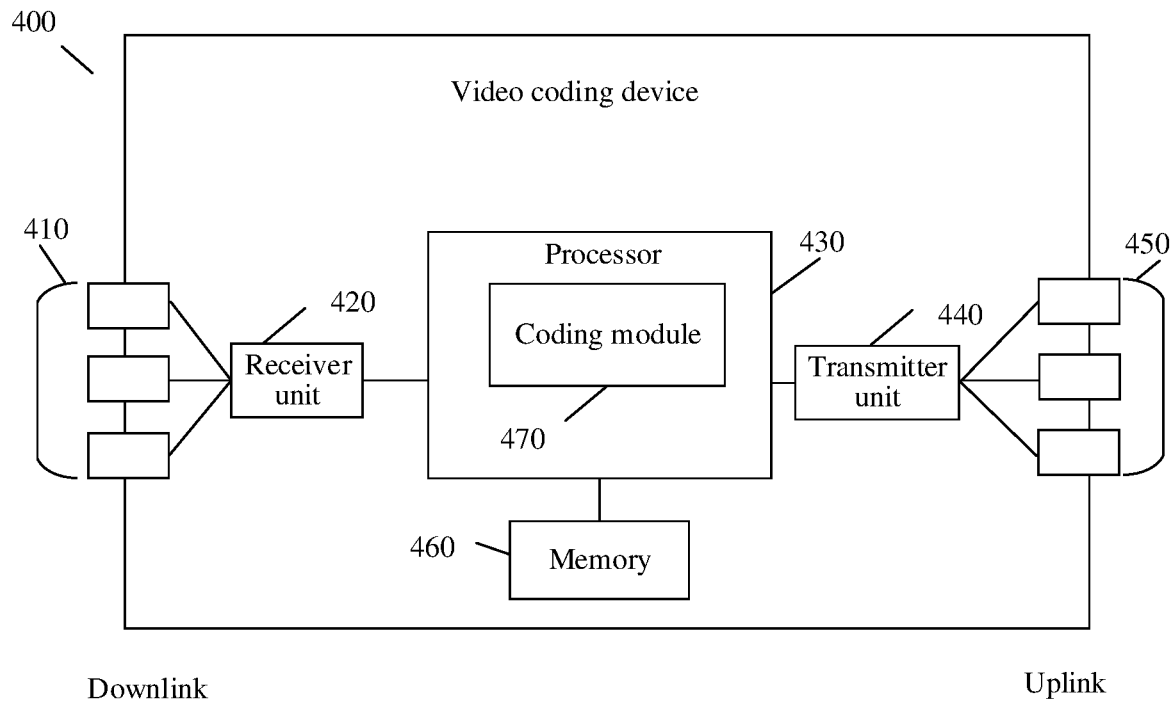
FIG. 4 is an example block diagram of a video coding device 400 according to an embodiment of this application.

FIG. 4 is a schematic diagram of a video coding device 400 according to an embodiment of the present technology. The video coding device 400 is suitable for implementing the disclosed embodiments as described herein. In an embodiment, the video coding device 400 may be a decoder such as the video decoder 30 of FIG. 1A or an encoder such as the video encoder 20 of FIG. 1A.

The video coding device 400 includes ingress ports 410 (or input ports 410) and receiver units (Rx) 420 for receiving data; a processor, a logic unit, or a central processing unit (CPU) 430 for processing the data, for example, the processor 430 may be a neural network processing unit 430; transmitter units (Tx) 440 and egress ports 450 (or output ports 450) for transmitting the data; and a memory 460 for storing the data. The video coding device 400 may also include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 is in communication with the ingress ports 410, the receiver units 420, the transmitter units 440, the egress ports 450, and the memory 460. The processor 430 includes a coding module 470 (for example, a neural network NN-based coding module 470). The coding module 470 implements the disclosed embodiments described above. For example, the coding module 470 implements, processes, prepares, or provides the various coding operations. Therefore, inclusion of the encoding/decoding module 470 provides a substantial improvement to functions of the video coding device 400 and affects a switching of the video coding device 400 to a different state. Alternatively, the coding module 470 is implemented as instructions stored in the memory 460 and executed by the processor 430.

The memory 460 may include one or more disks, tape drives, and solid-state drives and may be used as an overflow data storage device, to store programs when such programs are selected for execution, and to store instructions and data that are read during program execution. The memory 460 may be volatile and/or non-volatile and may be a read-only memory (ROM), a random access memory (RAM), a ternary content-addressable memory (TCAM), and/or a static random-access memory (SRAM).

FIG. 5 is a simplified block diagram of an apparatus 500 according to an example embodiment. The apparatus 500 may be used as either or both of the source device 12 and the destination device 14 in FIG. 1A A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, for example, the processor 502, advantages in speed and efficiency can be achieved using more than one processor.

In an implementation, a memory 504 in the apparatus 500 can be a read only memory (ROM) device or a random access memory (RAM) device. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 may include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although the bus 512 of the apparatus 500 is depicted here as a single bus, the bus 512 can include a plurality of buses. Further, a secondary storage may be directly coupled to the other components of the apparatus 500 or may be accessed via a network and may include a single integrated unit such as a memory card or multiple units such as multiple memory cards. The apparatus 500 can thus be implemented in a wide variety of configurations.

Embodiments of this application relate to application of a neural network. For ease of understanding, the following first explains some nouns or terms used in embodiments of this application. The nouns or terms are also used as a part of contents of the present technology.

(1) Neural Network

The neural network (neural Network, NN) is a machine learning model. The neural network may include neurons. The neuron may be an operation unit that uses $x_s$ and an intercept of 1 as inputs, where an output of the operation unit may be as follows:

$$h_{W,b}(x) = f(W^T x) = f(\Sigma_{s=1}^{n} = W_s x_s + b) \tag{1-1}$$

s=1, 2, . . . , or n, n is a natural number greater than 1, $W_s$ is a weight of $x_s$, and b is bias of the neuron. f is an activation function (activation function) of the neuron, used to introduce a non-linear feature into the neural network, to convert an input signal in the neuron into an output signal. The output signal of the activation function may serve as an input of a next convolution layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. There is no special metric for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is definitely connected to any neuron in an $(i+1)^{th}$ layer. Although the DNN seems to be complex, the DNN is actually not complex in terms of work at each layer, and is simply expressed as the following linear relationship expression: $\vec{y}=\alpha(W\vec{x}+\vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. At each layer, the output vector $\vec{y}$ is obtained by only performing such a simple operation on the input vector $\vec{x}$. Because there are many layers in the DNN, there are also many coefficients W and bias vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $w_{24}^3$. The superscript 3 represents a layer at which the coefficient W is located, and the subscript corresponds to an outputted third-layer index 2 and an inputted second-layer index 4. In conclusion, a coefficient from a $k^{th}$ neuron at an $(L-1)^{th}$ layer to a $j^{th}$ neuron at an $L^{th}$ layer is defined as $W_{jk}^L$. It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network

The convolutional neural network (CNN) is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input picture. The convolutional neural network includes a feature extractor constituted by a convolutional layer and a pooling layer. The feature extractor may be considered as a filter. A convolution process may be considered as using a trainable filter to perform convolution on an input picture or a convolutional feature plane (feature map).

The convolutional layer is a neuron layer that is in the convolutional neural network and at which convolution processing is performed on an input signal. The convolutional layer may include a plurality of convolution operators. The convolution operator is also referred to as a kernel. In picture processing, the convolution operator functions as a filter that extracts specific information from an input picture matrix. The convolution operator may essentially be a weight matrix, and the weight matrix is usually predefined. In a process of performing a convolution operation on a picture, the weight matrix is usually used to process pixels at a granularity level of one pixel (or two pixels, depending on a value of a stride) in a horizontal direction on the input picture, to extract a specific feature from the picture. A size of the weight matrix should be related to a size of the picture. It should be noted that a depth dimension of the weight matrix is the same as a depth dimension of the input picture. During a convolution operation, the weight matrix extends to an entire depth of the input picture. Therefore, convolution with a single weight matrix generates convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional picture. The dimension herein may be understood as being determined based on the foregoing "plurality". Different weight matrices may be used to extract different features from the picture. For example, one weight matrix is used to extract edge information of the picture, another weight matrix is used to extract a specific color of the picture, and still another weight matrix is used to blur unnecessary noise in the picture. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix formed by using the weight values obtained through training may be used to extract information from an input picture, so that the convolutional neural network performs correct prediction. When the convolutional neural network has a plurality of convolutional layers, a large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a small size. The average pooling operator may be used to calculate pixel values in the picture in a specific range, to generate a mean. The mean is used an average pooling result. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each sample in the picture output from the pooling layer represents a mean or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input picture are reduced. However, to generate final output information (required class information or other related information), the convolutional neural network needs to use the neural network layer to generate an output of one required type or a group of required types. Therefore, the neural network layer may include a plurality of hidden layers. Parameters included in the plurality of hidden layers may be obtained through pre-training based on related training data of a specific task type. For example, the task type may include picture recognition, picture classification, and super-resolution picture reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, back propagation is started to update a weight value and a deviation of each layer mentioned above, to reduce a loss of the convolutional neural network and an error between a result outputted by the convolutional neural network by using the output layer and an ideal result.

(4) Recurrent Neural Network

The recurrent neural network (RNN) is used to process sequence data. A conventional neural network model starts from an input layer to a hidden layer and then to an output layer, and the layers are fully connected, while nodes in each layer are unconnected. Although this ordinary neural network resolves many problems, it is still incompetent to many problems. For example, if it is expected to predict a next word in a sentence, a preceding word usually needs to be used, because words in a sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements are interconnected. For example, the stock changes with time. For another example, a person says "I like traveling, and the most favorite place is Yunnan. In the future, when there is a chance, I will go to (_____)" Herein, people should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(7) Generative Adversarial Network

The generative adversarial network (GAN) is a deep learning model. The model includes at least two modules: one module is a generative model, and the other module is a discriminative model. The two modules perform mutual game learning, to generate a better output. Both the generative model and the discriminative model may be neural networks, and may be specifically deep neural networks or convolutional neural networks. A basic principle of the GAN is as follows: Using a GAN for generating an image as an example, it is assumed that there are two networks: G (Generator) and D (Discriminator). G is a network for generating an image. G receives random noise z, and generates the image by using the noise, where the picture is denoted as G(z). D is a discriminator network used to determine whether an image is "real". An input parameter of D is x, x represents an image, and an output D(x) represents a probability that x is a real image. If a value of D(x) is 1, it indicates that the image is 100% real. If the value of D(x) is 0, it indicates that the image cannot be real. In a process of training the generative adversarial network, an objective of the generative network G is to generate an image that is as real as possible to deceive the discriminative network D, and an objective of the discriminative network D is to distinguish between the image generated by G and a real image as much as possible. In this way, a dynamic "game" process, to be specific, "adversary" in the "generative adversarial network", exists between G and D. A final game result is that in an ideal state, G may generate an image G(z) that is to be difficultly distinguished from a real picture, and it is difficult for D to determine whether the image generated by G is real, to be specific, D(G(z))=0.5. In this way, an excellent generative model G is obtained, and can be used to generate an image.

Figure 6:
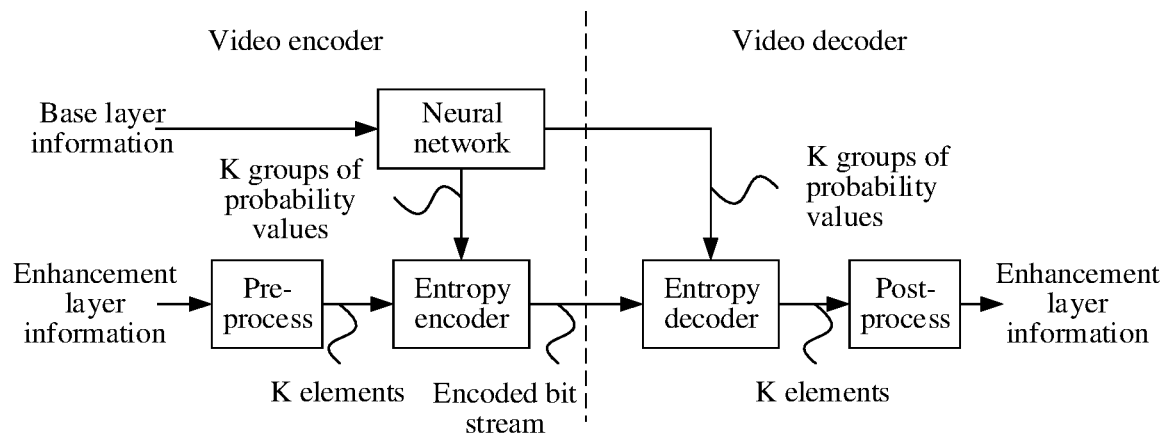
FIG. 6 is an example framework diagram of an entropy encoding/decoding method according to an embodiment of this application.

FIG. 6 is an example framework diagram of an entropy encoding/decoding method according to an embodiment of this application. As shown in FIG. 6, a video encoder processes an original value of a picture block to obtain base layer information and enhancement layer information of the picture block, and the video encoder inputs the base layer information into a neural network to obtain K groups of probability values, and pre-processes the enhancement layer information to obtain K elements. The video encoder performs entropy encoding on the K elements based on the K groups of probability values to obtain encoded data corresponding to the enhancement layer information. A video decoder obtains the base layer information from a bit stream, inputs the base layer information into the neural network to obtain the K groups of probability values, then performs entropy decoding on the encoded data in the bit stream based on the K groups of probability values to obtain the K elements, and then performs post-processing on the K elements to obtain the enhancement layer information, to further obtain a reconstruction value of the picture block based on the enhancement layer information.

Figure 7:
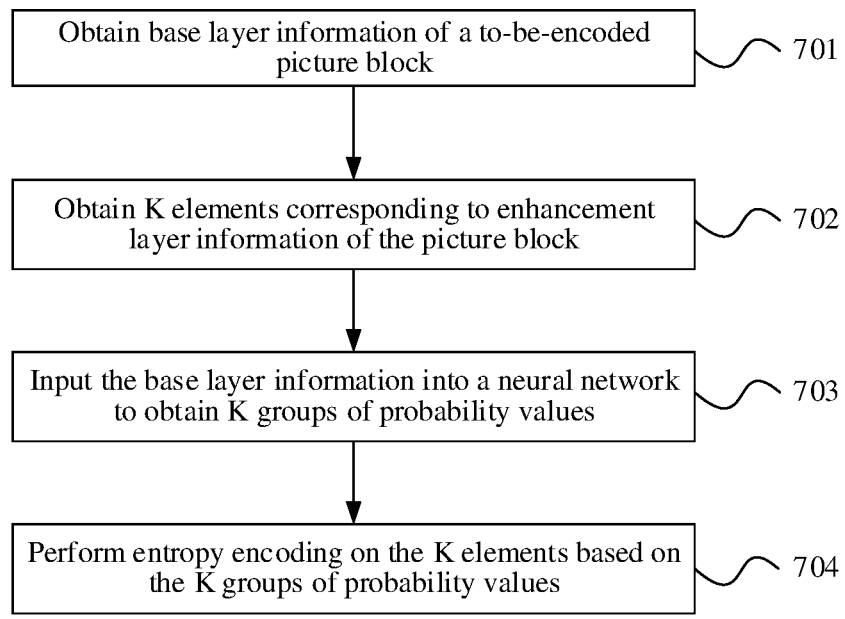
FIG. 7 is an example flowchart of a process 700 of an entropy encoding method according to an embodiment of this application.

FIG. 7 is a flowchart of a process 700 of an entropy encoding method according to an embodiment of this application. The process 700 may be performed by a video encoder 20, and specifically, may be performed by an entropy encoding unit 270 of the video encoder 20. The process 700 is described as a series of steps or operations. It should be understood that steps or operations of the process 700 may be performed in various sequences and/or simultaneously, not limited to an execution sequence shown in FIG. 7. Assuming that the video encoder is being used for a video data stream with a plurality of picture frames, the process 700 including the following steps is performed to implement entropy encoding. The process 700 may include:

Step 701: Obtain base layer information of a to-be-encoded picture block.

The picture block may be any complete picture frame in a video data stream, or may be any picture block or picture area obtained by partitioning any picture frame in the video data stream. For ease of description, in this application, a picture frame, a picture block, or a picture area is collectively referred to as a "picture block". It should be understood that, although referred to as a picture block, this is not a limitation on an encoded object.

In a layered coding technology, for a to-be-encoded picture block, an encoder may code the picture block in any encoding manner (for example, a hybrid encoding manner or an E2E picture encoding manner), and obtained encoded information is base layer information. The encoder decodes the encoded information in a decoding manner corresponding to the foregoing encoding manner to obtain a reconstruction value of the picture block, and then calculates a difference between an original value and the reconstruction value of the picture block, that is, enhancement layer information of the picture block.

It can be learned that, the base layer information of the picture block (assuming that the picture block includes N samples) corresponds to M samples in the picture block, where M≤N. This is because downsampling processing may be further included in a coding process, so that a quantity M of samples corresponding to the base layer information obtained through compression coding is less than a quantity N of samples included in the original picture block. If downsampling processing is not performed in the coding process, the quantity M of samples corresponding to the base layer information is equal to the quantity N of samples included in the original picture block.

In a possible implementation, the base layer information includes reconstruction values of the M samples.

The encoder may encode the picture block in an encoding manner such as E2E picture encoding to obtain encoded data, and then the encoder decodes the encoded data in a decoding manner corresponding to the encoding manner, to obtain the reconstruction values of the M samples in the picture block. Therefore, the base layer information may include the reconstruction values of the M samples.

In a possible implementation, the base layer information includes predicted values and/or residual values of the M samples.

The encoder encodes the picture block in a hybrid encoding manner to obtain encoded data, and then the encoder decodes the encoded data in a hybrid decoding manner to obtain predicted values and/or residual values of the M samples in the picture block. Based on encoding and decoding efficiency, a residual value obtained through decoding may be 0. When the residual value is 0, reconstruction values of the M samples may be obtained, that is, predicted values of the M samples. When the residual value is not 0, a sum calculation may be performed based on the predicted values of the M samples and the residual values to obtain the reconstruction values of the M samples. Therefore, the base layer information may include the reconstruction values of the M samples, or may include the predicted values and/or residual values of the M samples.

In a possible implementation, the base layer information refers to DCT transform values of the M samples in the picture block.

After obtaining the residual values of the M samples, the encoder may transform (for example, DCT transform) the residual values to obtain the DCT transform values of the M samples. Optionally, the encoder may directly transform (for example, DCT transform) original values of the M samples, to obtain the DCT transform values of the M samples.

Step 702: Obtain K elements corresponding to enhancement layer information of the picture block.

As a supplement to a gain of the picture block, the enhancement layer information corresponds to the N samples in the picture block. In this application, there may be the following several cases and obtaining methods for the K elements:

1. The K Elements are K Eigenvalues.

The encoder may perform feature extraction on original values of the N samples in the picture block, to obtain K eigenvalues. Based on this, the K elements are the K eigenvalues.

The enhancement layer information of the picture block may refer to the original values of the N samples. Therefore, the K elements corresponding to the enhancement layer information may be the K eigenvalues corresponding to the original values of the N samples.

Figure 8:
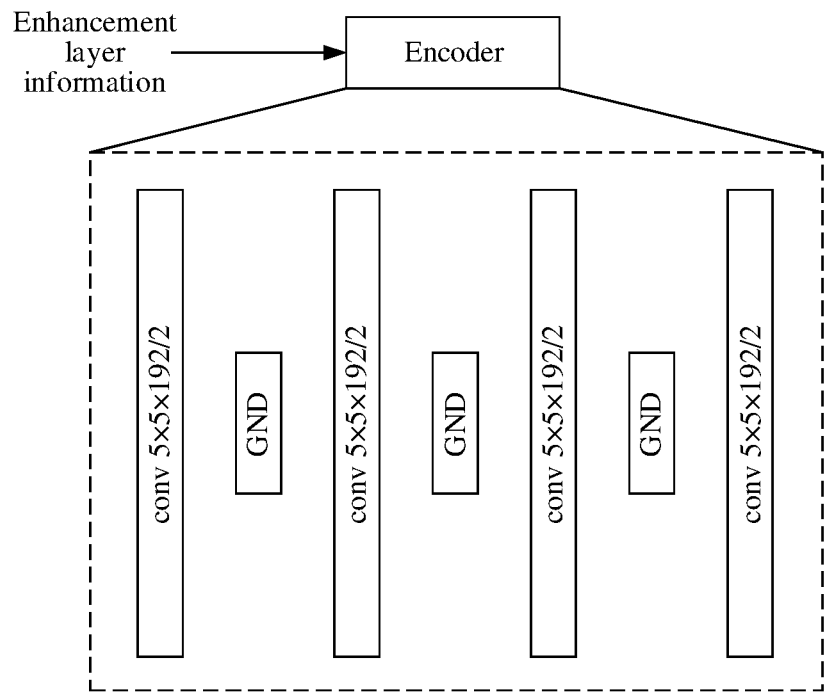
FIG. 8 is a schematic diagram of an example of a feature extraction method according to an embodiment of this application.

Feature extraction is a concept in computer vision and picture processing, and refers to a method and a process of extracting characteristic information from a picture by using a computer. A result of feature extraction is to divide samples on the picture into different subsets, which usually belong to isolated points, continuous curves, or continuous regions. FIG. 8 is a schematic diagram of an example of a feature extraction method according to an embodiment of this application. As shown in FIG. 8, enhancement layer information (that is, original values of N samples) is represented by using an A×B×c matrix, where A×B represents a size of a picture block, and c represents a quantity of components in a color space of the picture block. For example, in a YUV color space, if c is 1, it indicates that three components Y, U, and V are encoded separately, that is, each of the three components corresponds to an A×B×1 matrix; if c is 2, it indicates that any two components of the three components Y, U, and V are encoded simultaneously, that is, any two components of the three components correspond to an A×B×2 matrix; and if c is 3, it indicates that the three components Y, U, and V are encoded simultaneously, that is, the three components correspond to an A×B×3 matrix. An encoder for feature extraction includes a convolution layer (cony) and a normalization layer (GND). For example, four convs and three GNDs are alternately cascaded to form an encoder. A size of the cony may be 5×5×192/2, where 5×5 represents a size of a convolution kernel, 192 represents a depth of a convolution layer (a quantity of included channels), and 2 represents a downsampling factor. The encoder generates a P×Q×M matrix, where P×Q represents a size of a feature map, M represents a quantity of channels of the feature map, and values of elements in the matrix are the foregoing K eigenvalues.

2. The K Elements are K Difference Eigenvalues.

The encoder may perform hybrid encoding on the original values of the N samples to obtain encoded values of the N samples; perform hybrid decoding on the encoded values of the N samples to obtain reconstruction values of the N samples; perform a difference calculation based on the original values of the N samples and the reconstruction values of the N samples to obtain first differences of the N samples; and perform feature extraction on the first differences of the N samples to obtain K difference eigenvalues. Based on this, the K elements are the K difference eigenvalues.

The enhancement layer information of the picture block may refer to the first differences of the N samples. Therefore, the K elements corresponding to the enhancement layer information may be the K difference eigenvalues corresponding to the first differences of the N samples. Similarly, the encoder shown in FIG. 8 may be used to perform feature extraction on the enhancement layer information (that is, the first differences of the N samples) to obtain the K difference eigenvalues.

3. The K Elements are K Transform Value Eigenvalues.

The encoder may obtain predicted values of the N samples; perform a difference calculation based on original values of the N samples and the predicted values of the N samples to obtain second differences of the N samples; transform the second differences of the N samples to obtain transform values of the N samples; and perform feature extraction on the transform values of the N samples to obtain K transform value eigenvalues. Based on this, the K elements are the K transform value eigenvalues.

The enhancement layer information of the picture block may refer to the transform values of the N samples. Therefore, the K elements corresponding to the enhancement layer information may be the K transform value eigenvalues corresponding to the transform values of the N samples. Similarly, the encoder shown in FIG. 8 may be used to perform feature extraction on the enhancement layer information (that is, the transform values of the N samples) to obtain the K transform value eigenvalues.

4. The K Elements Include Coordinates of a Last Non-Zero Value, a First Value, and Other Values.

The encoder may obtain predicted values of the N samples; perform a difference calculation based on original values of the N samples and the predicted values of the N samples to obtain second differences of the N samples; transform the second differences of the N samples to obtain transform values of the N samples; quantize the transform values of the N samples to obtain quantized transform values of the N samples; and extract coordinates of a last non-zero value from the quantized transform values of the N samples, a first value of the quantized transform values of the N samples, and all values between a second value of the quantized transform values of the N samples and the last non-zero value. Based on this, the K elements include the coordinates of the last non-zero value, the first value, and the all values between the second value and the last non-zero value.

The enhancement layer information of the picture block may refer to the quantized transform values of the N samples. Therefore, the K elements corresponding to the enhancement layer information may include the coordinates of the last non-zero value (Last x,y) extracted from the quantized transform values of the N samples, the first value (DC coefficient) of the quantized transform values of the N samples, and the all values (AC coefficient) between the second value of the quantized transform values of the N samples and the last non-zero value.

Optionally, the encoder may perform hybrid encoding on the original values of the M samples corresponding to the base layer information to obtain encoded values of the M samples; perform hybrid decoding on the encoded values of the M samples to obtain the reconstruction values of the M samples; and obtain the predicted values of the N samples based on the reconstruction values of the M samples. In a possible implementation, when hybrid encoding is performed on the original values of the M samples, only mode information related to prediction modes of the M samples is encoded, and an encoded object does not include residual values of the M pixels. In this case, the reconstruction values of the M samples obtained by performing hybrid decoding on the encoded values of the M samples are the predicted values of the M samples.

When N=M, the encoder may obtain the predicted values of the N samples based on the reconstruction values of the M samples; or when N>M, the encoder needs to first perform interpolation on the reconstruction values of the M samples to obtain reconstruction values of the N samples, and then obtain the predicted values of the N samples based on the reconstruction values of the N samples.

Step 703: Input the base layer information into a neural network to obtain K groups of probability values.

Figure 9:
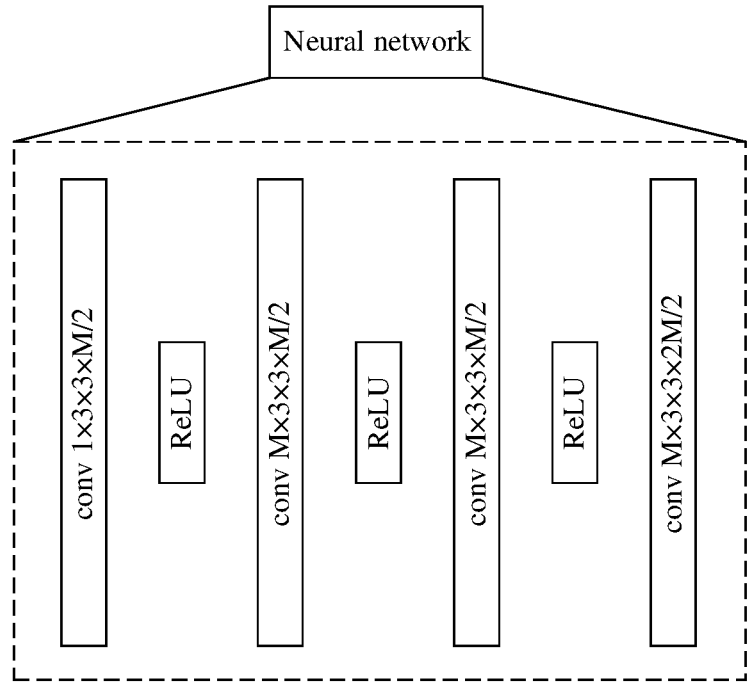
FIG. 9 is a structural diagram of an example of a neural network according to an embodiment of this application.

The neural network is obtained by performing training by a training engine based on a training dataset. The neural network may process base layer information of an input picture block, to generate K groups of probability values corresponding to the K elements. FIG. 9 is a structural diagram of an example of a neural network according to an embodiment of this application. As shown in FIG. 9, the neural network includes a convolution layer (cony) and an activation layer (ReLU). For example, four convs and three ReLUs are alternately cascaded to form the neural network. A size of a first cony may be 1×3×3×M/2, 1 represents a quantity of channels of an input picture block, 3λ3 represents a size of a convolution kernel, M represents a quantity of channels of a feature map outputted by a convolution layer, and 2 represents a downsampling factor. A size of a second cony may be M×3×3×M/2, M represents a quantity of channels of an input picture block, 3×3 represents a size of a convolution kernel, M represents a quantity of channels of a feature map outputted by a convolution layer, and 2 represents a downsampling factor. A size of a third cony may be M×3×3×M/2, M represents a quantity of channels of an input picture block, 3×3 represents a size of a convolution kernel, M represents a quantity of channels of a feature map outputted by a convolution layer, and 2 represents a downsampling factor. A size of a fourth cony may be M×3×3×2M/2, M represents a quantity of channels of an input picture block, 3×3 represents a size of a convolution kernel, 2M represents a quantity of channels of a feature map outputted by a convolution layer, and 2 represents a downsampling factor.

In this embodiment of this application, the training dataset is associated with the foregoing K elements. To be specific, for different physical meanings of the K elements, the training dataset changes accordingly.

Optionally, when the K elements are the K eigenvalues, the K difference eigenvalues, or the K transform value eigenvalues, the training dataset includes original values of M samples of each of a plurality of picture blocks and K groups of probability values respectively corresponding to N samples of each of the plurality of picture blocks.

Optionally, when the K elements are the Last x,y, the DC coefficient, and the AC coefficient, the training dataset includes quantized transform values of M samples of each of a plurality of picture blocks and K groups of probability values respectively corresponding to N samples of each of the plurality of picture blocks.

In a possible implementation, a process in which the training engine trains the neural network includes: training the neural network on NVIDIA V100 GPUs by using PyTorch software. For example, an adaptive moment estimation (Adam) algorithm is used to optimize and train the neural network, and a DIV2K dataset is used as a training dataset of the neural network. At a base layer of a picture block, compression coding is performed on the picture block by using VVC reference software, and a residual value (that is, enhancement layer information) of the enhancement-layer picture block is obtained through calculation by using an original value of the picture block and a reconstruction value (obtained by using base layer information of the picture block) of the picture block. An encoder network extracts an eigenvalue of the residual value of the enhancement-layer picture block, the neural network estimates probability distribution of the eigenvalue of the residual value of the enhancement-layer picture block based on the residual value corresponding to the base layer information, and a decoder network reconstructs the residual value of the enhancement-layer picture block based on the eigenvalue of the residual value. To efficiently couple the encoder network, the decoder network, and the entropy estimation neural network, the encoder network, the decoder network, and the entropy estimation neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}[-\log_2 p_y(y)] + \lambda \mathbb{E}\|\Delta\Delta x - \Delta x'\|_2$$

$p_y(y)$ represents a $y^{th}$ group of probability values outputted by the neural network, $\Delta x$ represents the residual value of the picture block, and $\Delta x'$ represents the reconstruction value of the residual value of the picture block.

In a possible implementation, a process in which the training engine trains the neural network includes: training the neural network on NVIDIA V100 GPUs by using PyTorch software. For example, an Adam algorithm is used to optimize and train the neural network, and a DIV2K dataset is used as a training dataset of the neural network. At a base layer of a picture block, compression coding is performed on the picture block by using VVC reference software, then decoding is performed to obtain a reconstruction value of the picture block, and a residual value of the enhancement-layer picture block is obtained through calculation by using an original value of the picture block and the reconstruction value (obtained by using base layer information of the picture block) of the picture block. An encoder network extracts an eigenvalue of the residual value of the enhancement-layer picture block, the neural network estimates probability distribution of the eigenvalue of the residual value of the enhancement-layer picture block based on a base-layer reconstruction value. The decoder reconstructs a higher-quality reconstruction value based on the eigenvalue of the residual value and the base-layer reconstruction value. To efficiently couple the encoder, the decoder, and the neural network, the encoder, the decoder, and the neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}[-\log_2 p_y(y)] + \lambda \mathbb{E}\|x - x'\|_2$$

x represents the original value of the picture block, and x' represents the reconstruction value of the picture block.

In a possible implementation, a process in which the training engine trains the neural network includes: training the neural network on NVIDIA V100 GPUs by using PyTorch software. For example, an Adam algorithm is used to optimize the neural network, and a DIV2K dataset is used as a training dataset of the neural network. At a base layer of a picture block, compression coding is performed by using any codec, and then decoding is performed to obtain a reconstruction value (obtained by using base layer information of the picture block) of the picture block. At an enhancement layer of the picture block, compression coding is performed on the picture block by using VVC reference software, and a transform value of the picture block is extracted. An encoder network extracts an eigenvalue of the transform value of the enhancement-layer picture block, the neural network estimates probability distribution of the eigenvalue of the transform value of the enhancement-layer picture block based on a transform value of a base-layer reconstruction value. The decoder reconstructs the transform value of the enhancement-layer picture block based on the eigenvalue of the transform value. To efficiently couple the encoder, the decoder, and the neural network, the encoder, the decoder, and the neural network may be jointly trained. An optimization objective of training is the same as an optimization objective of end-to-end picture coding, and joint rate-distortion (R+λD) optimization is performed. A function expression of the joint rate-distortion optimization is as follows:

$$R+\lambda D = \mathbb{E}[-\log_2 p_y(y)] + \lambda \mathbb{E}\|T - T'\|_2$$

$p_y(y)$ represents a $y^{th}$ group of probability values outputted by the neural network, T represents the transform value of the picture block, and T' represents the transform value of the residual value of the picture block.

Figure 10:
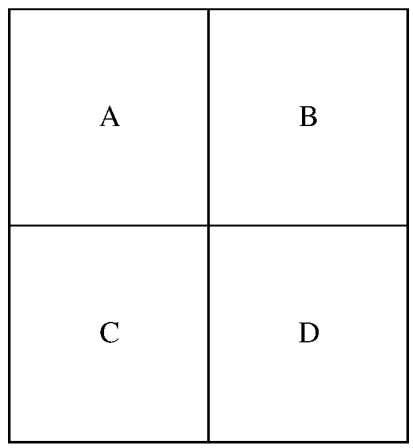
FIG. 10 is a schematic diagram of an example of K elements according to an embodiment of this application.
Figure 10:
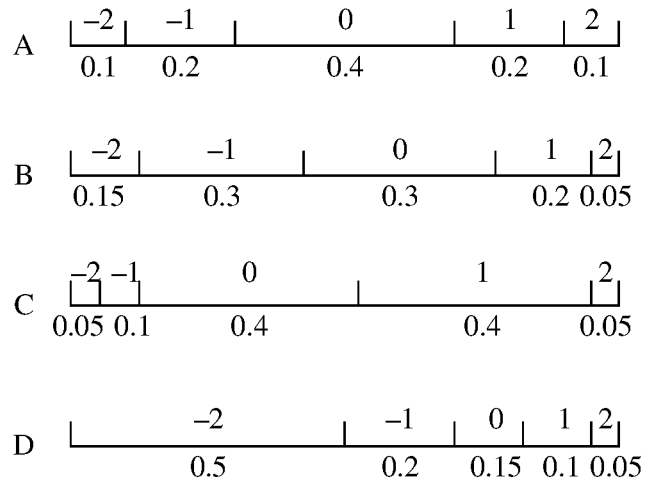

The K groups of probability values correspond to the foregoing K elements, and any group of probability values is for representing probabilities of a plurality of candidate values of a corresponding element. For example, FIG. 10 is a schematic diagram of an example of K elements according to an embodiment of this application. As shown in FIG. 10, it is assumed that the K elements include four feature points A, B, C, and D, and value ranges of the four feature points are all {−2, −1, 0, 1, 2}. A group of probability values corresponding to A includes four probability values, and the four probability values respectively correspond to four values in the value range {−2, −1, 0, 1, 2} of A. A group of probability values corresponding to B includes four probability values, and the four probability values respectively correspond to four values in the value range {−2, −1, 0, 1, 2} of B. The rest can be deduced by analogy. It can be learned that each feature point (element) corresponds to a group of probability values, and a quantity of probability values included in each group of probability values is associated with a value range of a feature point corresponding to the group of probability values.

In this application, the base layer information obtained in step 701 is inputted into the neural network to obtain the K groups of probability values. The neural network may include a convolution layer (cony) and an activation layer (ReLU). For example, four convs and three ReLUs are alternately cascaded to form the neural network. For training and use of the neural network, refer to related descriptions of the training engine 25.

In a possible implementation, when the probabilities of the plurality of candidate values of the some or all of the K elements in the foregoing several cases satisfy the Gaussian distribution, a group of probability values corresponding to an element that satisfies the Gaussian distribution includes a variance and a mean of the Gaussian distribution satisfied by the element. In other words, values of each element are discrete. Therefore, probabilities of a plurality of candidate values of one or more elements satisfy Gaussian probability distribution. Therefore, the neural network may use a variance and a mean of Gaussian distribution satisfied by each of the one or more elements to represent probability values of the plurality of candidate values of each of the one or more elements.

Step 704: Perform entropy encoding on the K elements based on the K groups of probability values.

Figure 11:
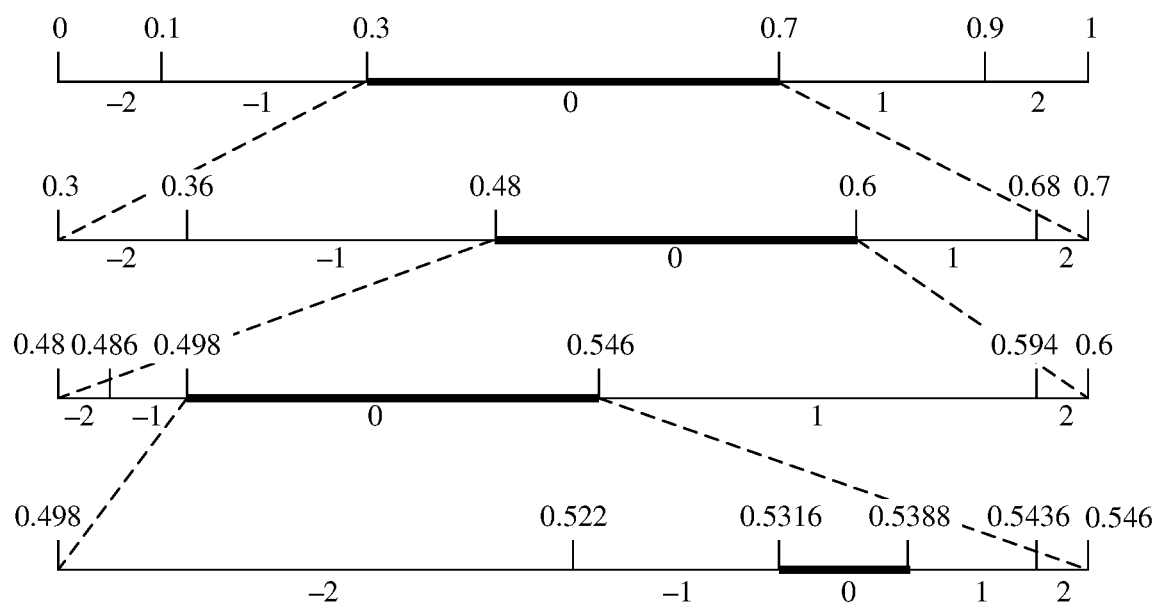
FIG. 11 is a schematic diagram of an example of an arithmetic coding algorithm according to an embodiment of this application.

In this application, entropy coding is performed by using K groups of probability values outputted by the neural network. For example, as shown in FIG. 10, value ranges of A, B, C, and D are all {−2, −1, 0, 1, 2}. For each candidate value of A, a probability value of −2 is 0.1, a probability value of −1 is 0.2, a probability value of 0 is 0.4, a probability value of 1 is 0.2, and a probability value of 2 is 0.1. For each candidate value of B, a probability value of −2 is 0.15, a probability value of −1 is 0.3, a probability value of 0 is 0.3, a probability value of 1 is 0.2, and a probability value of 2 is 0.05. For each candidate value of C, a probability value of −2 is 0.05, a probability value of −1 is 0.1, a probability value of 0 is 0.4, a probability value of 1 is 0.4, and a probability value of 2 is 0.05. For each candidate value of D, a probability value of −2 is 0.5, a probability value of −1 is 0.2, a probability value of 0 is 0.15, a probability value of 1 is 0.1, and a probability value of 2 is 0.05. Therefore, FIG. 11 is a schematic diagram of an example of an arithmetic coding algorithm according to an embodiment of this application. As shown in FIG. 11, based on the arithmetic coding algorithm, a probability interval [0, 1] is divided layer by layer based on respective values of A, B, C, and D, and the respective values of A, B, C, and D are represented as an interval within a probability interval corresponding to A, B, C, and D. A lower boundary of a finally outputted "current interval" is an encoded code word. It is assumed that values of A, B, C, and D are all 0. Based on probability values of candidate values of A, a probability interval [0, 1] is divided into five intervals: 0 to 0.1, 0.1 to 0.3, 0.3 to 0.7, 0.7 to 0.9, and 0.9 to 1, where an interval corresponding to the value 0 is 0.3 to 0.7. Based on probability values of candidate values of B, a probability interval [0.3, 0.7] is divided into five intervals: 0.3 to 0.36, 0.36 to 0.48, 0.48 to 0.6, 0.6 to 0.68, and 0.68 to 0.7, where an interval corresponding to the value 0 is 0.48 to 0.6. Based on probability values of candidate values of C, a probability interval [0.48, 0.6] is divided into five intervals: 0.48 to 0.486, 0.486 to 0.498, 0.498 to 0.546, 0.546 to 0.594, and 0.594 to 0.6, where an interval corresponding to the value 0 is 0.498 to 0.546. Based on probability values of candidate values of D, a probability interval [0.498, 0.546] is divided into five intervals: 0.498 to 0.522, 0.522 to 0.5316, 0.5316 to 0.5388, 0.5388 to 0.5436, and 0.5436 to 0.546, where an interval corresponding to the value 0 is 0.5316 to 0.5388. Therefore, the "current interval" is 0.5316 to 0.5388, and has a lower boundary 0.5316 used as an encoded code word. The encoder may write 0.5316 fixed-point representation into a bit stream.

In this application, a correlation between the enhancement layer and the base layer in the layered coding technology is fully explored, probability estimation is performed on a plurality of elements corresponding to the enhancement layer information by using the base layer information, to obtain probability values of high accuracy, and then entropy coding is performed on the plurality of elements based on the probability values, thereby improving entropy coding efficiency.

Figure 12:
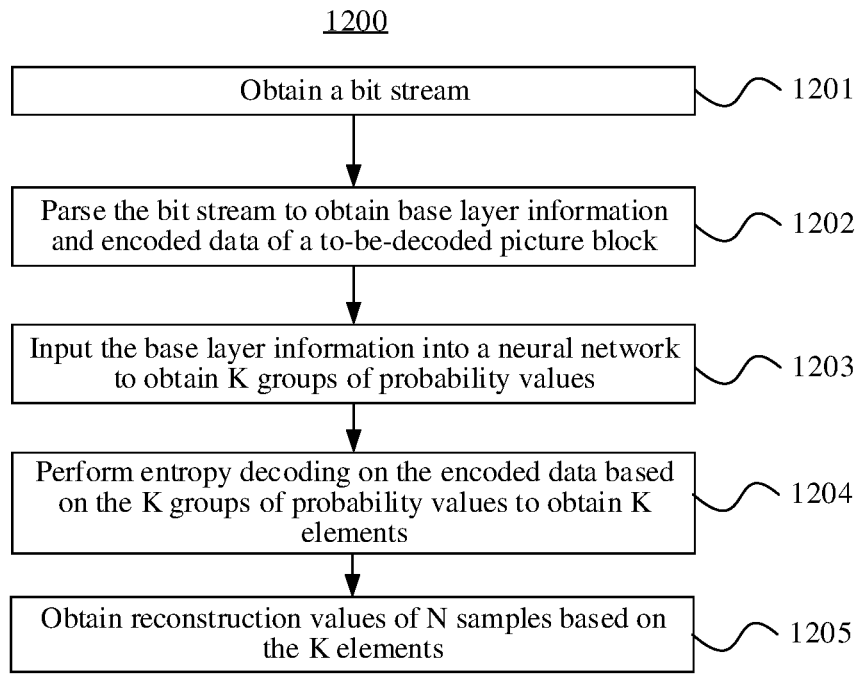
FIG. 12 is an example flowchart of a process 1200 of an entropy decoding method according to an embodiment of this application.

FIG. 12 is a flowchart of a process 1200 of an entropy decoding method according to an embodiment of this application. The process 1200 may be performed by a video decoder 30, and specifically, may be performed by an entropy decoding unit 304 of the video decoder 30. The process 1200 is described as a series of steps or operations. It should be understood that steps or operations of the process 1200 may be performed in various sequences and/or simultaneously, not limited to an execution sequence shown in FIG. 12. Assuming that the video decoder is being used for an encoded bit stream corresponding to a plurality of picture frames, the process 1200 including the following steps is performed to implement entropy decoding. The process 1200 may include:

Step 1201: Obtain a bit stream.

A decoder may receive the bit stream by using a communication link between the decoder and an encoder.

Step 1202: Parse the bit stream to obtain base layer information and encoded data of a to-be-decoded picture block.

For the to-be-decoded picture block, the decoder parses the bit stream corresponding to the to-be-decoded picture block, and obtains the base layer information from data, where the base layer information corresponds to the M samples in the picture block. The bit stream further includes the encoded data corresponding to the enhancement layer information of the picture block, and the decoder may read the encoded data from a data payload, where the enhancement layer information corresponds to the N samples in the picture block, and N≥M.

Step 1203: Input the base layer information into a neural network to obtain K groups of probability values.

For step 1203, refer to step 703 in the embodiment shown in FIG. 7.

Step 1204: Perform entropy decoding on the encoded data based on the K groups of probability values to obtain K elements.

The K groups of probability values correspond to the K elements, and any group of probability values is for representing probabilities of a plurality of candidate values of a corresponding element. For example, as shown in FIG. 10 and FIG. 11, obtained encoded code words are 0.5316 and probability values of five candidate values of each of four feature points A, B, C, and D. For each candidate value of A, an interval to which 0.5316 belongs is 0.3 to 0.7, and the interval corresponds to a value 0, so that a value of A is 0. For each candidate value of B, an interval to which 0.5316 belongs is 0.48 to 0.6, and the interval corresponds to a value 0, so that a value of B is 0. For each candidate value of C, an interval to which 0.5316 belongs is 0.498 to 0.546, and the interval corresponds to a value 0, so that a value of C is 0. For each candidate value of D, an interval to which 0.5316 belongs is 0.5316 to 0.5388, and the interval corresponds to a value 0, so that a value of D is 0. Therefore, it can be learned that the K elements are the four feature points A, B, C, and D, and values of the four feature points are all 0.

Step 1205: Obtain reconstruction values of N samples based on the K elements.

Corresponding to the encoder side, the K elements may also be implemented in a plurality of manners, and specific representation objects of the K elements may be agreed upon by both the encoder side and the decoder side; or the encoder side may add indication information of the K elements to a bit stream and transmit the bit stream to the decoder side, and the decoder side parses the bit stream to obtain the indication information.

1. The K Elements are K Eigenvalues.

The decoder may perform inverse feature extraction on the K eigenvalues to obtain the reconstruction values of the N samples.

2. The K Elements are K Difference Eigenvalues.

The decoder may perform inverse feature extraction on the K difference eigenvalues to obtain first differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the first differences of the N samples.

3. The K Elements are K Transform Value Eigenvalues.

The decoder may perform inverse feature extraction on the K transform value eigenvalues to obtain transform values of the N samples; inversely transform the transform values of the N samples to obtain second differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the second differences of the N samples.

4. The K Elements Include Coordinates of a Last Non-Zero Value in the Transform Values of the N Samples, a First Value, and Other Values.

The decoder may perform inverse quantization based on the coordinates of the last non-zero value, the first value in the transform values of the N samples, and the all values between the second value and the last non-zero value to obtain transform values of the N samples; inversely transform the transform values of the N samples to obtain second differences of the N samples; parse the bit stream to obtain reconstruction values of the M samples corresponding to the base layer information of the picture block, where N≥M; obtain the predicted values of the N samples based on the reconstruction values of the M samples; and obtain the reconstruction values of the N samples based on the predicted values of the N samples and the second differences of the N samples.

Optionally, when N≥M, the decoder may perform interpolation on the reconstruction values of the M samples to obtain reconstruction values of the N samples; and perform a sum calculation based on the reconstruction values of the N samples and the first differences of the N samples to obtain reconstruction values of the N samples. Alternatively, when N=M, the decoder may perform a sum calculation based on the reconstruction values of the M samples and the first differences of the N samples to obtain reconstruction values of the N samples.

Optionally, when N≥M, the decoder may perform interpolation on the predicted values of the M samples to obtain predicted values of the N samples; and perform a sum calculation based on the predicted values of the N samples and the second differences of the N samples to obtain the reconstruction values of the N samples; or when N=M, the decoder may perform a sum calculation based on the predicted values of the M samples and the second differences of the N samples to obtain reconstruction values of the N samples.

In the bit stream of this application, an enhancement layer carries only a plurality of element values corresponding to the enhancement layer information of the picture block, and the decoder side uses the neural network to estimate, based on the base layer information, probability values of a plurality of candidate values of a plurality of elements corresponding to the enhancement layer information. Therefore, no additional hidden variable needs to be encoded and transmitted, thereby saving bytes and improving entropy decoding efficiency.

The method in the foregoing embodiment is described in the following by using several specific embodiments.

Embodiment 1

Figure 13:
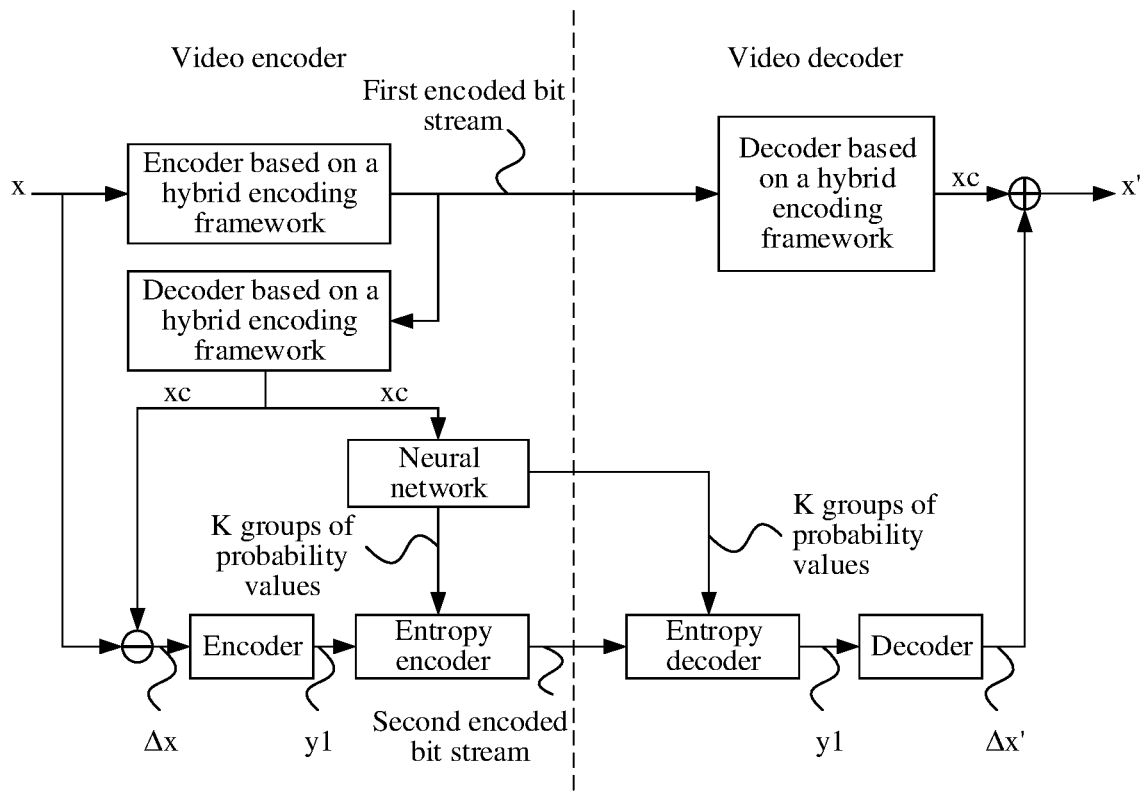
FIG. 13 is an example flowchart of an entropy encoding method according to this application.
Figure 14:
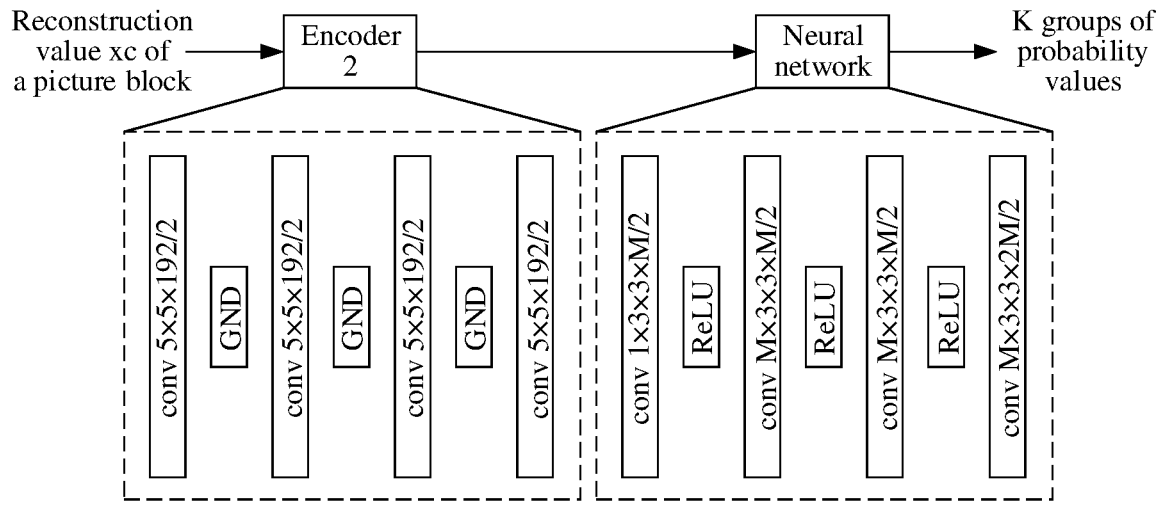
FIG. 14 is a structural block diagram of an example of a neural network according to this application.

FIG. 13 is an example flowchart of an entropy encoding method according to this application. As shown in FIG. 13, x represents an original value of a picture block. In a video encoder, x is encoded by using an encoder based on a hybrid encoding framework to obtain a first encoded bit stream corresponding to base layer information, and then the first encoded bit stream is decoded by using a decoder based on a hybrid decoding framework to obtain a reconstruction value xc of a picture block. The video encoder inputs the reconstruction value xc of the picture block into a neural network to obtain K groups of probability values. Optionally, as shown in FIG. 14, before inputting the reconstruction value xc of the picture block into the neural network, the video encoder may first input the reconstruction value xc of the picture block into an encoder 2 for feature extraction, and then input eigenvalues corresponding to the reconstruction value xc of the picture block into the neural network to obtain K groups of probability values. It should be noted that, for a structure of the encoder 2, refer to the embodiment shown in FIG. 8. Alternatively, the structure of the encoder 2 may be another structure. This is not specifically limited in this application. The video encoder performs a difference calculation based on the original value x of the picture block and the reconstruction value xc of the picture block to obtain a residual value Δx of the picture block, and then inputs the residual value Δx of the picture block into the encoder for feature extraction to obtain K difference eigenvalues y1 corresponding to the residual value of the picture block. The video encoder performs entropy encoding on the K difference eigenvalues y1 based on the K groups of probability values to obtain a second encoded bit stream corresponding to the enhancement layer information.

The video decoder decodes the received first encoded bit stream by using the decoder based on the hybrid decoding framework, to obtain the reconstruction value xc of the picture block. The video decoder inputs the reconstruction value xc of the picture block into the neural network to obtain K groups of probability values, and then decodes data in the second encoded bit stream based on the K groups of probability values in an entropy decoding manner corresponding to the entropy encoding manner, to obtain K difference eigenvalues y1. The video decoder performs inverse feature extraction on the K difference eigenvalues y1 by using a decoder corresponding to the encoder, to obtain the residual value Δx' of the picture block. The video decoder performs a sum calculation on the residual value Δx' of the picture block and the reconstruction value xc of the picture block to obtain a final reconstruction value x' of the picture block.

For the foregoing entropy encoding and entropy decoding methods, refer to the embodiments shown in FIG. 7 and FIG. 12.

Embodiment 2

Figure 15:
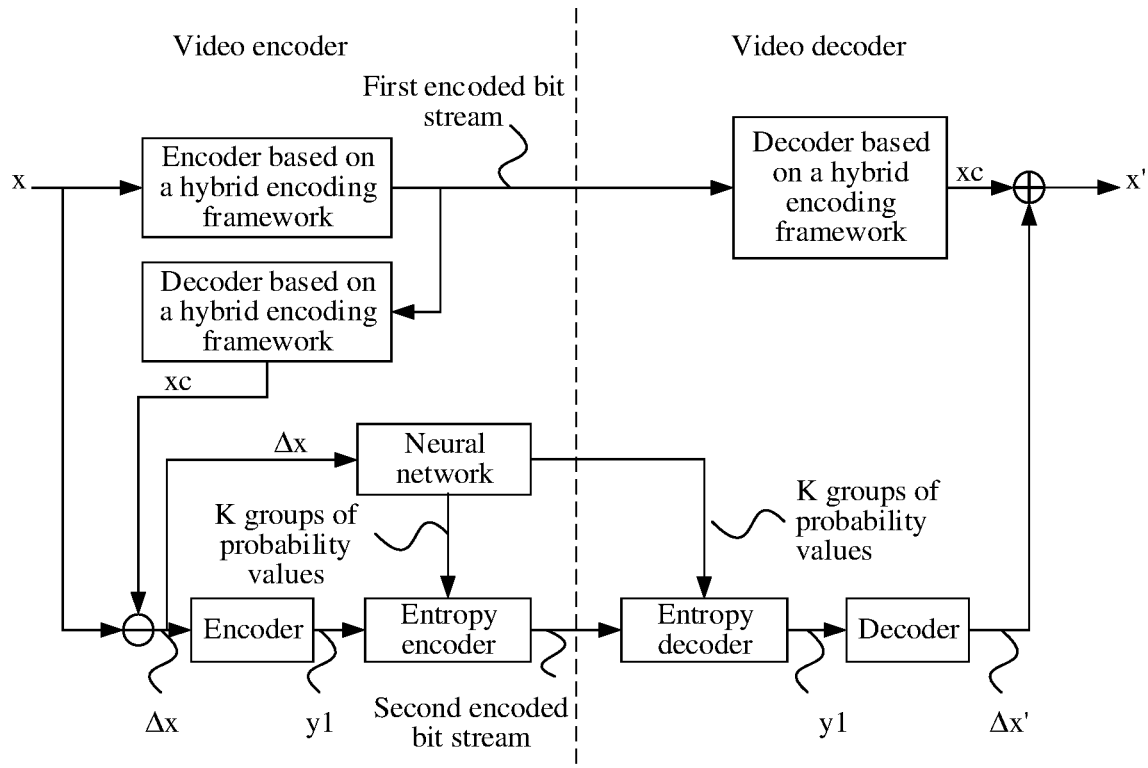
FIG. 15 is an example flowchart of an entropy encoding method according to this application.

FIG. 15 is an example flowchart of an entropy encoding method according to this application. As shown in FIG. 15, x represents an original value of a picture block. A difference from Embodiment 1 lies in: The video encoder and the decoder input the residual value Δx of the picture block into the neural network. That is, in this embodiment, K groups of probability values are obtained based on the residual value Δx of the picture block.

Embodiment 3

Figure 16:
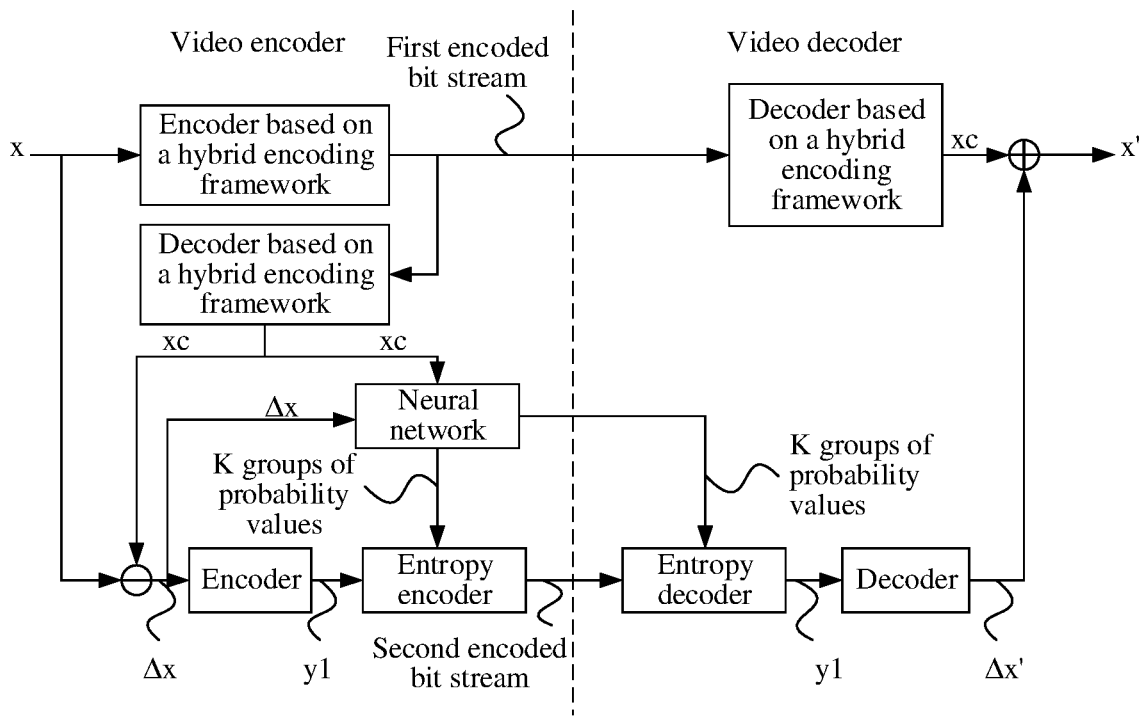
FIG. 16 is an example flowchart of an entropy encoding method according to this application.

FIG. 16 is an example flowchart of an entropy encoding method according to this application. As shown in FIG. 16, x represents an original value of a picture block. A difference from Embodiment 1 lies in: The video encoder and the decoder input both the residual value Δx of the picture block and the reconstruction value xc of the picture block into the neural network. That is, in this embodiment, K groups of probability values are obtained based on the residual value Δx of the picture block and the reconstruction value xc of the picture block.

Embodiment 4

Figure 17:
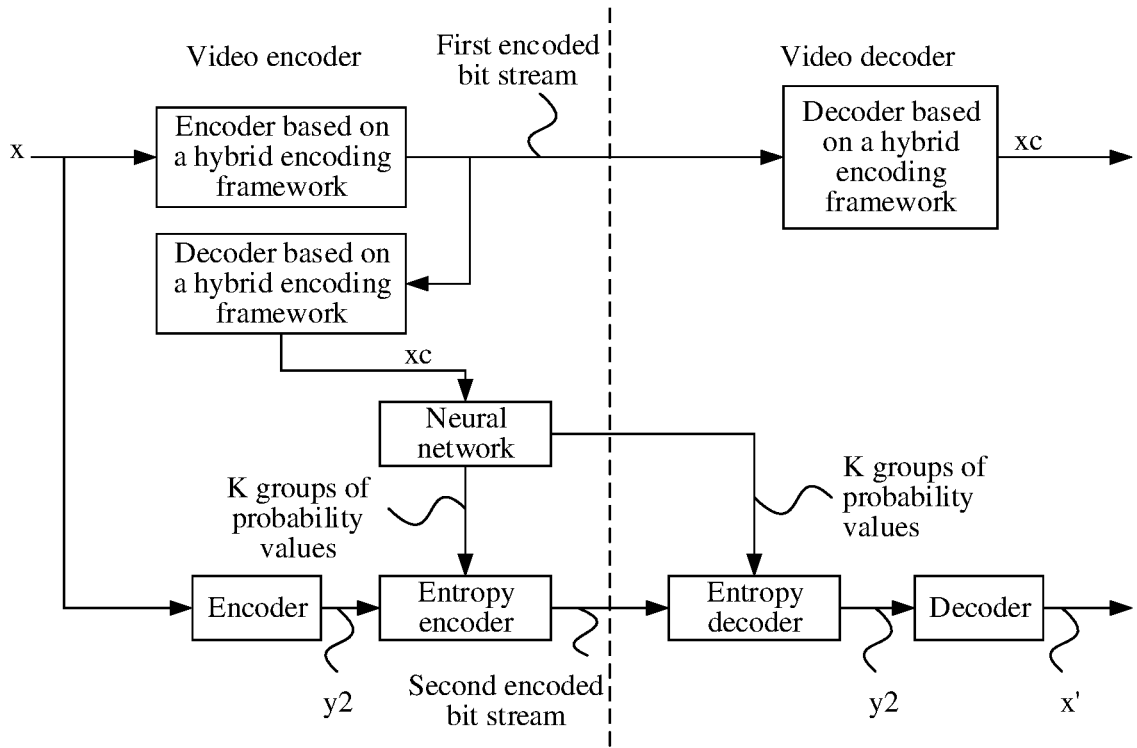
FIG. 17 is an example flowchart of an entropy encoding method according to this application.

FIG. 17 is an example flowchart of an entropy encoding method according to this application. As shown in FIG. 17, x represents an original value of a picture block. A difference from Embodiment 1 lies in: The video encoder inputs the original value x of the picture block into the encoder for feature extraction, to obtain K eigenvalues y2 corresponding to the original value of the picture block. Correspondingly, the video decoder inputs the reconstruction value xc of the base-layer picture block into the neural network to obtain K groups of probability values, decodes the data in the second encoded bit stream in an entropy decoding manner corresponding to the entropy encoding manner to obtain K eigenvalues y2, and then performs inverse feature extraction on the K eigenvalues y2 by using a decoder corresponding to the encoder, to obtain the reconstruction value x' of the picture block.

It should be noted that in this embodiment, for data inputted by the video encoder into the neural network, further refer to Embodiment 2 and Embodiment 3.

Embodiment 5

Figure 18:
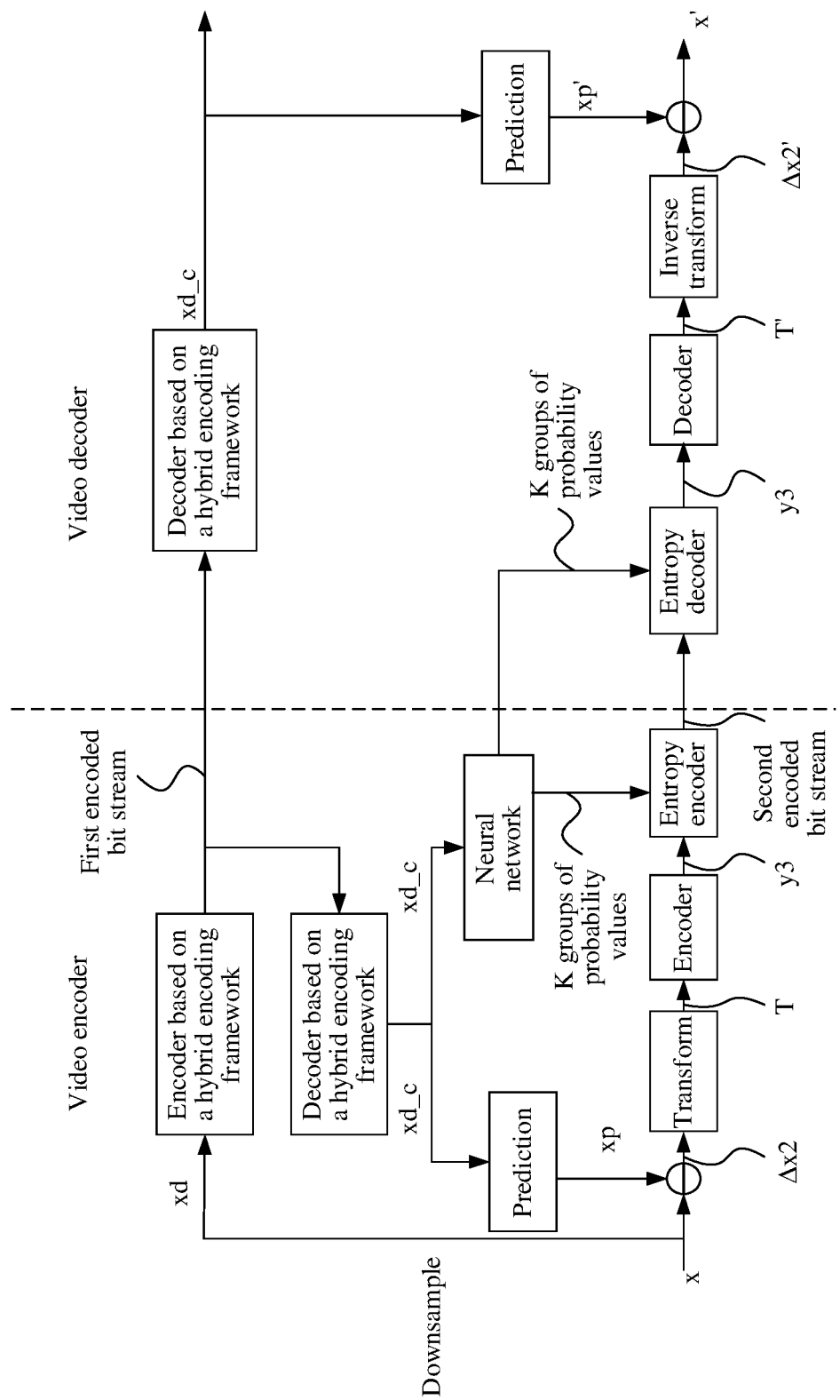
FIG. 18 is an example flowchart of an entropy encoding method according to this application.

FIG. 18 is an example flowchart of an entropy encoding method according to this application. As shown in FIG. 18, x represents an original value of a picture block. A video encoder first performs downsampling on the original value x of the picture block to obtain a quantized original value xd of the picture block. For example, a size of the picture block is 256×256, and a size corresponding to the quantized original value xd of the downsampled picture block is 128×128. The quantized original value xd of the picture block is encoded by using an encoder based on a hybrid encoding framework to obtain a first encoded bit stream corresponding to base layer information, and then the first encoded bit stream is decoded by using a decoder based on a hybrid decoding framework to obtain a quantized reconstruction value xd_c of the picture block. The video encoder inputs the quantized reconstruction value xd_c of the picture block into a neural network to obtain K groups of probability values. The video encoder obtains a predicted value xp of the picture block based on the quantized reconstruction value xd_c of the picture block, and then performs a difference calculation based on the original value x of the picture block and the predicted value xp of the picture block to obtain a second difference Δx2 of the picture block. The video encoder transforms the second difference Δx2 of the picture block to obtain a transform value T of the picture block, and inputs the transform value T of the picture block into the encoder for feature extraction to obtain K transform value eigenvalues y3 corresponding to the transform value of the picture block. The video encoder performs entropy encoding on the K transform value eigenvalues y3 based on the K groups of probability values to obtain a second encoded bit stream corresponding to the enhancement layer information.

The video decoder decodes the received first encoded bit stream by using the decoder based on the hybrid decoding framework, to obtain the quantized reconstruction value xd_c of the picture block. The video decoder inputs the quantized reconstruction value xd_c of the picture block into the neural network to obtain K groups of probability values, and then decodes data in the second encoded bit stream based on the K groups of probability values in an entropy decoding manner corresponding to the entropy encoding manner, to obtain K transform value eigenvalues y3. The video decoder performs inverse feature extraction on the K transform value eigenvalues y3 by using a decoder corresponding to the encoder, to obtain the transform value T' of the picture block. The video decoder inversely transforms the transform value T' of the picture block to obtain a second difference Δx2' of the picture block. The video decoder obtains a predicted value xp' of the picture block based on the quantized reconstruction value xd_c of the picture block. The video decoder performs a sum calculation on the predicted value xp' of the picture block and the second difference Δx2' of the picture block to obtain a final reconstruction value x' of the picture block.

Embodiment 6

Figure 19:
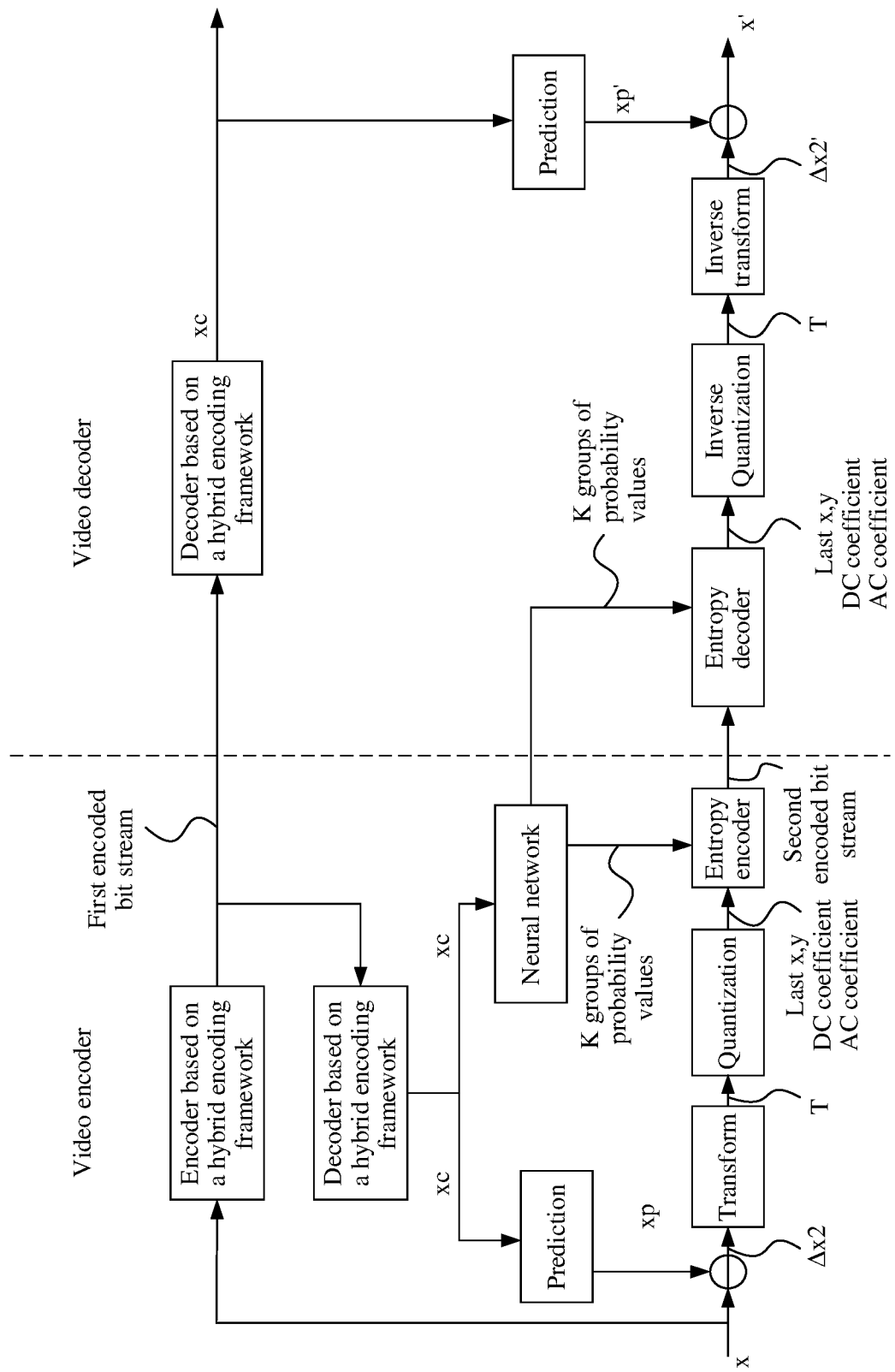
FIG. 19 is an example flowchart of an entropy encoding method according to this application.

FIG. 19 is an example flowchart of an entropy encoding method according to this application. As shown in FIG. 19, x represents an original value of a picture block. A video encoder encodes the original value x of the picture block by using an encoder based on a hybrid encoding framework to obtain a first encoded bit stream corresponding to base layer information, and then the first encoded bit stream is decoded by using a decoder based on a hybrid decoding framework to obtain a reconstruction value xc of a picture block. The video encoder inputs the reconstruction value xc of the picture block into a neural network to obtain K groups of probability values. The video encoder obtains a predicted value xp of the picture block based on the reconstruction value xc of the picture block, and then performs a difference calculation based on the original value x of the picture block and the predicted value xp of the picture block to obtain a second difference Δx2 of the picture block. The video encoder transforms the second difference Δx2 of the picture block to obtain a transform value T of the picture block, and then quantizes the transform value T of the picture block to obtain a quantized transform value T' of the picture block. The video encoder extracts, from the quantized transform value T' of the picture block, coordinates of a last non-zero value (Last x, y), a first value (DC coefficient), and all values (AC coefficient) between a second value and the last non-zero value. The video encoder performs entropy encoding on the Last x,y, the DC coefficient, and the AC coefficient based on the K groups of probability values to obtain a second encoded bit stream corresponding to the enhancement layer information.

The video decoder decodes the received first encoded bit stream by using the decoder based on the hybrid decoding framework, to obtain the reconstruction value xc of the picture block. The video decoder inputs the reconstruction value xc of the picture block into the neural network to obtain K groups of probability values, and then decodes data in the second encoded bit stream based on the K groups of probability values in an entropy decoding manner corresponding to the entropy encoding manner, to obtain the Last x,y, the DC coefficient, and the AC coefficient. The video decoder performs inverse quantization based on the Last x,y, the DC coefficient, and the AC coefficient to obtain the transform value T of the picture block. The video decoder inversely transforms the transform value T of the picture block to obtain a second difference Δx2' of the picture block. The video decoder obtains a predicted value xp' of the picture block based on the reconstruction value xc of the picture block. The video decoder performs a sum calculation on the predicted value xp' of the picture block and the second difference Δx2' of the picture block to obtain a final reconstruction value x' of the picture block.

Figure 20:
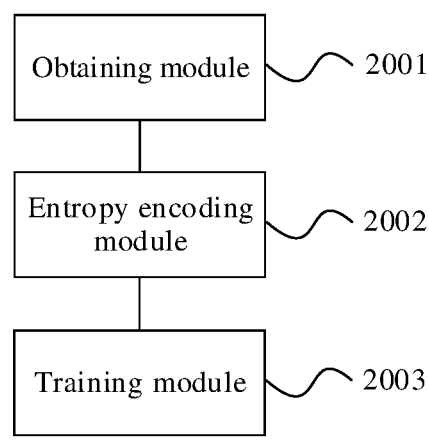
FIG. 20 is an example schematic structural diagram of an entropy encoding apparatus 2000 according to an embodiment of this application.

FIG. 20 is a schematic structural diagram of an entropy encoding apparatus 2000 according to an embodiment of this application. The entropy encoding apparatus 2000 may be a video encoder 20. The entropy encoding apparatus 2000 includes an obtaining module 2001, an entropy encoding module 2002, and a training module 2003.

The obtaining module 2001 is configured to obtain base layer information of a to-be-encoded picture block, where the base layer information corresponds to M samples in the picture block, and M is a positive integer; obtain K elements corresponding to enhancement layer information of the picture block, where the enhancement layer information corresponds to N samples in the picture block, both K and N are positive integers, and N≥M; and input the base layer information into a neural network to obtain K groups of probability values, where the K groups of probability values correspond to the K elements, and any group of probability values is for representing probabilities of a plurality of candidate values of a corresponding element; and the entropy encoding module 2002 is configured to perform entropy encoding on the K elements based on the K groups of probability values.

In a possible implementation, the base layer information includes reconstruction values of the M samples; the base layer information includes predicted values and/or residual values of the M samples; or the base layer information includes DCT transform values of the M samples.

In a possible implementation, the obtaining module 2001 is specifically configured to perform feature extraction on original values of the N samples to obtain K eigenvalues, where correspondingly, the K elements are the K eigenvalues.

In a possible implementation, the obtaining module 2001 is specifically configured to: perform hybrid encoding on original values of the N samples to obtain encoded values of the N samples; perform hybrid decoding on the encoded values of the N samples to obtain reconstruction values of the N samples; perform a difference calculation based on the original values of the N samples and the reconstruction values of the N samples to obtain first differences of the N samples; and perform feature extraction on the first differences of the N samples to obtain K difference eigenvalues, where correspondingly, the K elements are the K difference eigenvalues.

In a possible implementation, the obtaining module 2001 is specifically configured to: obtain predicted values of the N samples; perform a difference calculation based on original values of the N samples and the predicted values of the N samples to obtain second differences of the N samples; transform the second differences of the N samples to obtain transform values of the N samples; and perform feature extraction on the transform values of the N samples to obtain K transform value eigenvalues, where correspondingly, the K elements are the K transform value eigenvalues.

In a possible implementation, the obtaining module 2001 is specifically configured to: obtain predicted values of the N samples; perform a difference calculation based on original values of the N samples and the predicted values of the N samples to obtain second differences of the N samples; transform the second differences of the N samples to obtain transform values of the N samples; quantize the transform values of the N samples to obtain quantized transform values of the N samples; and extract coordinates of a last non-zero value from the quantized transform values of the N samples, a first value, and all values between a second value of the quantized transform values of the N samples and the last non-zero value, where correspondingly, the K elements include the coordinates of the last non-zero value, the first value, and the all values.

In a possible implementation, the obtaining module 2001 is specifically configured to: perform hybrid encoding on original values of the M samples to obtain encoded values of the M samples; perform hybrid decoding on the encoded values of the M samples to obtain the reconstruction values of the M samples; and obtain the predicted values of the N samples based on the reconstruction values of the M samples.

In a possible implementation, the obtaining module 2001 is specifically configured to: when N=M, obtain the predicted values of the N samples based on the reconstruction values of the M samples; or when N≥M, perform interpolation on the reconstruction values of the M samples to obtain reconstruction values of the N samples, and obtain the predicted values of the N samples based on the reconstruction values of the N samples.

In a possible implementation, when probabilities of a plurality of candidate values of a first element satisfy Gaussian distribution, a group of probability values corresponding to the first element includes a variance and a mean of the Gaussian distribution satisfied by the probabilities of the plurality of candidate values of the first element, and the first element is any one of the K elements.

In a possible implementation, the neural network includes a convolution layer; a depth of a convolution kernel of the convolution layer is 24, 32, 48, 64, 192, or 384; and a size of the convolution kernel of the convolution layer is 1×1, 3×3, 5×5, or 7×7.

In a possible implementation, the neural network includes a convolutional neural network (CNN), a deep neural network (DNN), or a recurrent neural network (RNN).

In a possible implementation, the apparatus further includes: a training module 2003, configured to obtain a training dataset, where the training dataset includes original values of M samples of each of a plurality of picture blocks and K groups of probability values respectively corresponding to N samples of each of the plurality of picture blocks; or the training dataset includes quantized transform values of M samples of each of a plurality of picture blocks and K groups of probability values respectively corresponding to N samples of each of the plurality of picture blocks; and perform training based on the training dataset to obtain the neural network.

The apparatus in this embodiment may be used to execute the technical solution in the method embodiment shown in FIG. 7, and implementation principles and technical effects of the apparatus are similar.

Figure 21:
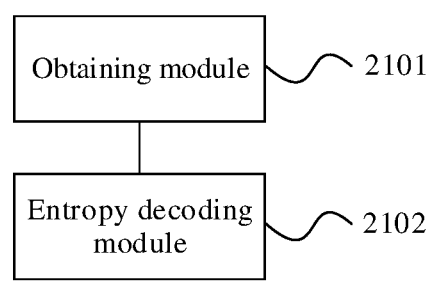
FIG. 21 is an example schematic structural diagram of an entropy decoding apparatus 2100 according to an embodiment of this application.

FIG. 21 is a schematic structural diagram of an entropy decoding apparatus 2100 according to an embodiment of this application. The entropy decoding apparatus 2100 may be a video decoder 30. The entropy decoding apparatus 2100 includes an obtaining module 2101 and an entropy decoding module 2102.

The obtaining module 2101 is configured to obtain a bit stream; and the entropy decoding module 2102 is configured to parse the bit stream to obtain base layer information and encoded data of a to-be-decoded picture block, where the base layer information corresponds to M samples in the picture block, the encoded data corresponds to enhancement layer information, the enhancement layer information corresponds to N samples in the picture block, both M and N are positive integers, and N≥M; input the base layer information into a neural network to obtain K groups of probability values, where the K groups of probability values correspond to K elements, any group of probability values is for representing probabilities of a plurality of candidate values of a corresponding element, and K is a positive integer; perform entropy decoding on the encoded data based on the K groups of probability values to obtain the K elements; and obtain reconstruction values of the N samples based on the K elements, where N is a positive integer.

In a possible implementation, when the K elements are K eigenvalues, the entropy decoding module is specifically configured to perform inverse feature extraction on the K eigenvalues to obtain the reconstruction values of the N samples.

In a possible implementation, when the K elements are K difference eigenvalues, the entropy decoding module 2102 is specifically configured to: perform inverse feature extraction on the K difference eigenvalues to obtain first differences of the N samples; parse the bit stream to obtain reconstruction values of the M samples corresponding to the base layer information of the picture block, where N≥M; and obtain the reconstruction values of the N samples based on the reconstruction values of the M samples and the first differences of the N samples.

In a possible implementation, when the K elements are K transform value eigenvalues, the entropy decoding module 2102 is specifically configured to: perform inverse feature extraction on the K transform value eigenvalues to obtain transform values of the N samples; inversely transform the transform values of the N samples to obtain second differences of the N samples; parse the bit stream to obtain reconstruction values of the M samples corresponding to the base layer information of the picture block, where N≥M; obtain predicted values of the M samples based on the reconstruction values of the M samples; and obtain the reconstruction values of the N samples based on the predicted values of the M samples and the second differences of the N samples.

In a possible implementation, when the K elements include coordinates of a last non-zero value of DCT transform values of the N samples, a first value of the transform values of the N samples, and all values between a second value of the quantized transform values of the N samples and the last non-zero value, the entropy decoding module 2102 is specifically configured to: perform inverse quantization based on the coordinates of the last non-zero value, the first value, and the all values to obtain the transform values of the N samples; inversely transform the transform values of the N samples to obtain second differences of the N samples; parse the bit stream to obtain reconstruction values of the M samples corresponding to the base layer information of the picture block, where N≥M; obtain predicted values of the M samples based on the reconstruction values of the M samples; and obtain the reconstruction values of the N samples based on the predicted values of the M samples and the second differences of the N samples.

In a possible implementation, the entropy decoding module is specifically configured to: when N>M, perform interpolation on the reconstruction values of the M samples to obtain reconstruction values of the N samples; and perform a sum calculation based on the reconstruction values of the N samples and the first differences of the N samples to obtain reconstruction values of the N samples; or when N=M, perform a sum calculation based on the reconstruction values of the M samples and the first differences of the N samples to obtain reconstruction values of the N samples.

In a possible implementation, the entropy decoding module 2102 is specifically configured to: when N>M, perform interpolation on the predicted values of the M samples to obtain predicted values of the N samples; and perform a sum calculation based on the predicted values of the N samples and the second differences of the N samples to obtain the reconstruction values of the N samples; or when N=M, perform a sum calculation based on the predicted values of the M samples and the second differences of the N samples to obtain reconstruction values of the N samples.

The apparatus in this embodiment may be used to execute the technical solution in the method embodiment shown in FIG. 12, and implementation principles and technical effects of the apparatus are similar.

In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and implementation constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and namely may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An entropy encoding method, comprising:
obtaining base layer information of a to-be-encoded picture block, wherein
the base layer information corresponds to M samples in the to-be-encoded picture block, and
M is a positive integer;
obtaining K elements corresponding to enhancement layer information of the to-be-encoded picture block, wherein
the enhancement layer information corresponds to N samples in the to-be-encoded picture block,
both K and N are positive integers, and
N≥M;
inputting the base layer information into a neural network to obtain K groups of probability values, wherein the K groups of probability values correspond to the K elements, and any group of probability values, from the K groups of probability values, represents probabilities of a plurality of candidate values of a corresponding element from the K elements; and performing entropy encoding, on the K elements based on the K groups of probability values, to generate an encoded bit stream, wherein obtaining the K elements corresponding to the enhancement layer information of the to-be-encoded picture block comprises at least:

performing hybrid encoding on the original values of the N samples to obtain encoded values of the N samples;

performing hybrid decoding on the encoded values of the N samples to obtain reconstruction values of the N samples;

performing difference calculation based on the original values of the N samples and the reconstruction values of the N samples to obtain first differences of the N samples, and performing feature extraction on the first differences of the N samples to obtain K difference eigenvalues, wherein the K elements are the K difference eigenvalues.

2. The entropy encoding method of claim 1, wherein the base layer information comprises reconstruction values of the M samples, the base layer information comprises predicted values and/or residual values of the M samples, or the base layer information comprises transform values of the M samples.

3. The entropy encoding method of claim 1, wherein obtaining the K elements corresponding to the enhancement layer information of the to-be-encoded picture block further comprises at least one of:

i) performing feature extraction on original values of the N samples to obtain K eigenvalues, wherein the K elements are the K eigenvalues;

ii) obtaining predicted values of the N samples;

performing a difference calculation based on the original values of the N samples and the predicted values of the N samples to obtain second differences of the N samples;

transforming the second differences of the N samples to obtain transform values of the N samples; and performing feature extraction on the transform values of the N samples to obtain K transform value eigenvalues, wherein the K elements are the K transform value eigenvalues; or iii) obtaining predicted values of the N samples;

performing a difference calculation based on the original values of the N samples and the predicted values of the N samples to obtain second differences of the N samples;

transforming the second differences of the N samples to obtain transform values of the N samples;

quantizing the transform values of the N samples to obtain quantized transform values of the N samples; and extracting coordinates of a last non-zero value from the quantized transform values of the N samples, a first value of the quantized transform values of the N samples, and all values between a second value of the quantized transform values of the N samples and the last non-zero value, wherein the K elements comprise the coordinates of the last non-zero value, the first value, and the all values.

4. The entropy encoding method of claim 3, wherein obtaining the predicted values of the N samples comprises:

performing hybrid encoding on original values of the M samples to obtain encoded values of the M samples;

performing hybrid decoding on the encoded values of the M samples to obtain the reconstruction values of the M samples; and obtaining the predicted values of the N samples based on the reconstruction values of the M samples.

5. The entropy encoding method of claim 4, wherein obtaining the predicted values of the N samples based on the reconstruction values of the M samples comprises:

when N=M, obtaining the predicted values of the N samples based on the reconstruction values of the M samples, or when N>M, obtaining reconstruction values of the N samples by performing interpolation on the reconstruction values of the M samples, and obtaining the predicted values of the N samples based on the reconstruction values of the N samples.

6. The entropy encoding method of claim 3, wherein when probabilities of a plurality of candidate values of a first element satisfy a Gaussian distribution, a group of probability values corresponding to the first element comprises a variance and a mean of the Gaussian distribution satisfied by the probabilities of the plurality of candidate values of the first element, and the first element is any one of the K elements.

7. The entropy encoding method of claim 1, wherein the neural network comprises a convolution layer, a depth of a convolution kernel of the convolution layer is 24, 32, 48, 64, 192, or 384, and a size of the convolution kernel of the convolution layer is 1×1, 3×3, 5×5, or 7×7.

8. The entropy encoding method of claim 7, further comprising:

obtaining a training dataset, wherein (a) the training dataset comprises original values of M samples of each of a plurality of picture blocks and K groups of probability values respectively corresponding to N samples of each of the plurality of picture blocks, or (b) the training dataset comprises quantized transform values of the M samples of each of the plurality of picture blocks and the K groups of probability values respectively corresponding to the N samples of each of the plurality of picture blocks; and obtaining the neural network by performing training based on the training dataset.

9. An entropy decoding method, comprising:

obtaining a bit stream;

obtaining base layer information and encoded data of a to-be-decoded picture block by parsing the bit stream, wherein the base layer information corresponds to M samples in the to-be-decoded picture block, the encoded data corresponds to enhancement layer information, the enhancement layer information corresponds to N samples in the to-be-decoded picture block, both M and N are positive integers, and

N≥M;

inputting the base layer information into a neural network to obtain K groups of probability values, wherein the K groups of probability values correspond to K elements, any group of probability values, from the K groups of probability values, represents probabilities of a plurality of candidate values of a corresponding element from the K elements, and K is a positive integer;

obtaining the K elements by performing entropy decoding on the encoded data based on the K groups of probability values; and obtaining reconstruction values of the N samples based on the K elements, wherein N is a positive integer, wherein obtaining the reconstruction values of the N samples based on the K elements comprises at least:

in association with the K elements being K difference eigenvalues, obtaining first differences of the N samples by performing inverse feature extraction on the K difference eigenvalues;

parsing the bit stream to obtain reconstruction values of the M samples corresponding to the base layer information of the to-be-decoded picture block, wherein N≥M; and obtaining the reconstruction values of the N samples based on the reconstruction values of the M samples and the first differences of the N samples.

10. The entropy decoding method of claim 9, wherein obtaining the reconstruction values of the N samples based on the K elements further comprises at least one of:

i) when the K elements are K eigenvalues, obtaining the reconstruction values of the N samples by performing inverse feature extraction on the K eigenvalues;

ii) when the K elements are K transform value eigenvalues, obtaining transform values of the N samples by performing inverse feature extraction on the K transform value eigenvalues;

inversely transforming the transform values of the N samples to obtain second differences of the N samples;

parsing the bit stream to obtain reconstruction values of the M samples corresponding to the base layer information of the to-be-decoded picture block, wherein N≥M;

obtaining predicted values of the M samples based on the reconstruction values of the M samples; and obtaining the reconstruction values of the N samples based on the predicted values of the M samples and the second differences of the N samples; or iii) when the K elements comprise coordinates of a last non-zero value of transform values of the N samples, a first value of the transform values of the N samples, and all values between a second value of the transform values of the N samples and the last non-zero value, performing inverse quantization based on the coordinates of the last non-zero value, the first value, and the all values to obtain the transform values of the N samples;

inversely transforming the transform values of the N samples to obtain second differences of the N samples;

parsing the bit stream to obtain reconstruction values of the M samples corresponding to the base layer information of the to-be-decoded picture block, wherein N≥M;

obtaining predicted values of the M samples based on the reconstruction values of the M samples; and obtaining the reconstruction values of the N samples based on the predicted values of the M samples and the second differences of the N samples.

11. The entropy decoding method of claim 10, wherein obtaining the reconstruction values of the N samples based on the reconstruction values of the M samples and the first differences of the N samples comprises:

when N>M, obtaining reconstruction values of the N samples by performing interpolation on the reconstruction values of the M samples, and obtaining final reconstruction values of the N samples by performing a sum calculation based on the reconstruction values of the N samples and the first differences of the N samples; or when N=M, obtaining reconstruction values of the N samples by performing the sum calculation based on the reconstruction values of the M samples and the first differences of the N samples.

12. The entropy decoding method of claim 10, wherein obtaining the reconstruction values of the N samples based on the predicted values of the M samples and the second differences of the N samples comprises:

when N>M, obtaining predicted values of the N samples by performing interpolation on the predicted values of the M samples, and obtaining the reconstruction values of the N samples by performing a sum calculation based on the predicted values of the N samples and the second differences of the N samples; or when N=M, obtaining reconstruction values of the N samples by performing a sum calculation based on the predicted values of the M samples and the second differences of the N samples.

13. A decoder, comprising:

a processor; and a memory operatively coupled to the processor and configured to store a program to be executed by the processor, wherein the program, when executed by the processor, causes the decoder to:

obtain a bit stream;

obtain base layer information and encoded data of a to-be-decoded picture block by parsing the bit stream, wherein the base layer information corresponds to M samples in the to-be-decoded picture block, the encoded data corresponds to enhancement layer information, the enhancement layer information corresponds to N samples in the to-be-decoded picture block, both M and N are positive integers, and

N≥M;

input the base layer information into a neural network to obtain K groups of probability values, wherein the K groups of probability values correspond to K elements, any group of probability values, from the K groups of probability values, represents probabilities of a plurality of candidate values of a corresponding element from the K elements, and K is a positive integer;

obtain the K elements by performing entropy decoding on the encoded data based on the K groups of probability values; and obtain reconstruction values of the N samples based on the K elements, wherein N is a positive integer, wherein the decoder obtains the reconstruction values of the N samples according to at least:

when the K elements are K difference eigenvalues, obtain first differences of the N samples by performing inverse feature extraction on the K difference eigenvalues, parse the bit stream to obtain reconstruction values of the M samples corresponding to the base layer information of the to-be-decoded picture block, wherein N≥M, and obtain the reconstruction values of the N samples based on the reconstruction values of the M samples and the first differences of the N samples.

14. The decoder of claim 13, wherein the decoder further obtains the reconstruction values of the N samples according to at least one of:
  i) when the K elements are K eigenvalues, obtain the reconstruction values of the N samples by performing inverse feature extraction on the K eigenvalues;
  ii) when the K elements are K transform value eigenvalues, obtain transform values of the N samples by performing inverse feature extraction on the K transform value eigenvalues;
  inversely transform the transform values of the N samples to obtain second differences of the N samples;
  parse the bit stream to obtain reconstruction values of the M samples corresponding to the base layer information of the to-be-decoded picture block, wherein N≥M;
  obtain predicted values of the M samples based on the reconstruction values of the M samples; and
  obtain the reconstruction values of the N samples based on the predicted values of the M samples and the second differences of the N samples; or
  iii) when the K elements comprise coordinates of a last non-zero value of transform values of the N samples, a first value of the transform values of the N samples, and all values between a second value of the transform values of the N samples and the last non-zero value, perform inverse quantization based on the coordinates of the last non-zero value, the first value, and the all values to obtain the transform values of the N samples;
  inversely transform the transform values of the N samples to obtain second differences of the N samples;
  parse the bit stream to obtain reconstruction values of the M samples corresponding to the base layer information of the to-be-decoded picture block, wherein N≥M;
  obtain predicted values of the M samples based on the reconstruction values of the M samples; and
  obtain the reconstruction values of the N samples based on the predicted values of the M samples and the second differences of the N samples.

15. The decoder of claim 14, wherein the decoder is further caused to:
  when N>M, obtain reconstruction values of the N samples by performing interpolation on the reconstruction values of the M samples, and obtain final reconstruction values of the N samples by performing a sum calculation based on the reconstruction values of the N samples and the first differences of the N samples; or
  when N=M, obtain reconstruction values of the N samples by performing a sum calculation based on the reconstruction values of the M samples and the first differences of the N samples.

16. The decoder of claim 14, wherein the decoder is further caused to:
  when N>M, obtain predicted values of the N samples by performing interpolation on the predicted values of the M samples, and obtain the reconstruction values of the N samples by performing a sum calculation based on the predicted values of the N samples and the second differences of the N samples; or
  when N=M, obtain reconstruction values of the N samples by performing a sum calculation based on the predicted values of the M samples and the second differences of the N samples.

17. The entropy encoding method of claim 1, wherein the neural network uses a variance and a mean of Gaussian distribution satisfied by each of the K elements to represent the probabilities of the plurality of candidate values.

18. A non-transitory computer readable store medium configured to store computer readable instructions that, when executed by a processor of an information processing device, cause the information processing device to provide execution comprising the entropy encoding method of claim 1.

19. A non-transitory computer readable store medium configured to store computer readable instructions that, when executed by a processor of an information processing device, cause the information processing device to provide execution comprising the entropy decoding method of claim 9.

20. The entropy encoding method of claim 1, wherein the encoded bit stream includes the base layer information and encoded data of a to-be-decoded picture block, and the encoded data corresponds to the enhancement layer information.

* * * * *